(12) United States Patent
Vilaplana et al.

(10) Patent No.: US 9,053,634 B2
(45) Date of Patent: *Jun. 9, 2015

(54) CONFLICT DETECTION AND RESOLUTION USING PREDICTED AIRCRAFT TRAJECTORIES

(71) Applicant: The Boeing Company, Chicago, IL (US)

(72) Inventors: Miguel Angel Vilaplana, Madrid (ES); Ernesto Valls Hernandez, Madrid (ES); Francisco Garcia de Blanes, Madrid (ES); Isabel del Pozo de Poza, Munich (DE)

(73) Assignee: THE BOEING COMPANY, Chicago, IL (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/902,672

(22) Filed: May 24, 2013

(65) Prior Publication Data

US 2013/0317734 A1 Nov. 28, 2013

(30) Foreign Application Priority Data

May 25, 2012 (EP) .................................... 12382207

(51) Int. Cl.
*G08G 5/04* (2006.01)
*G08G 5/00* (2006.01)
*G06Q 10/04* (2012.01)

(52) U.S. Cl.
CPC ................ *G08G 5/04* (2013.01); *G08G 5/0043* (2013.01); *G08G 5/00* (2013.01); *G08G 5/0004* (2013.01); *G06Q 10/047* (2013.01); *G08G 5/0013* (2013.01); *G08G 5/0039* (2013.01); *G08G 5/0078* (2013.01); *G08G 5/0082* (2013.01); *G08G 5/045* (2013.01)

(58) Field of Classification Search
CPC ..... G08G 5/00; G08G 5/0013; G08G 5/0004; G08G 5/0043; G08G 5/045; G08G 5/0039; G08G 5/04; G08G 5/0082; G08G 5/0078; G06Q 10/047
USPC .......................... 701/120, 122, 301; 340/961
See application file for complete search history.

(56) References Cited

U.S. PATENT DOCUMENTS 6,885,340 B2  4/2005  Smith et al.
6,950,037 B1  9/2005  Clavier et al.
(Continued)

FOREIGN PATENT DOCUMENTS

EP  2040137 A1  3/2009

OTHER PUBLICATIONS

European Search Report, dated Jul. 4, 2013, regarding Application No. EP12382206.6, 14 pages.
(Continued)

*Primary Examiner* — Russell Frejd
(74) *Attorney, Agent, or Firm* — Yee & Associates, P.C.

(57) ABSTRACT

A method of detecting conflicts between aircraft passing through managed airspace, and resolving the detected conflicts strategically. The method may include obtaining intended trajectories of aircraft through the airspace, detecting conflicts in the intended trajectories, forming a set of the conflicted aircraft, calculating one or more revised trajectories for the conflicted aircraft such that the conflicts are resolved, and advising the conflicted aircraft subject to revised trajectories of the revised trajectories.

17 Claims, 11 Drawing Sheets

(56) References Cited

U.S. PATENT DOCUMENTS

| | | |
|---|---|---|
| 7,623,957 B2 | 11/2009 | Bui et al. |
| 8,560,148 B2 | 10/2013 | Torres et al. |
| 8,594,917 B2 | 11/2013 | Sawhill et al. |
| 2005/0156777 A1 | 7/2005 | King et al. |
| 2006/0146048 A1 | 7/2006 | Wright et al. |
| 2007/0222665 A1 | 9/2007 | Koeneman |
| 2008/0059052 A1 | 3/2008 | Bui et al. |
| 2009/0012660 A1 | 1/2009 | Roberts et al. |
| 2010/0215435 A1 | 8/2010 | Luo et al. |
| 2010/0241345 A1* | 9/2010 | Cornell et al. ............ 701/120 |
| 2010/0305781 A1 | 12/2010 | Felix |
| 2011/0077803 A1 | 3/2011 | Dehais et al. |
| 2011/0118981 A1 | 5/2011 | Chamlou |
| 2012/0004837 A1 | 1/2012 | McDonald |
| 2012/0083946 A1 | 4/2012 | Maldonado et al. |
| 2012/0083997 A1* | 4/2012 | Meador et al. ............ 701/120 |
| 2012/0116614 A1 | 5/2012 | Torres et al. |
| 2012/0158219 A1 | 6/2012 | Durling et al. |
| 2012/0303253 A1 | 11/2012 | Irfan et al. |
| 2013/0085661 A1 | 4/2013 | Chan et al. |
| 2013/0317733 A1 | 11/2013 | Del Pozo de Poza et al. |
| 2013/0332059 A1 | 12/2013 | del Pozo de Poza |
| 2013/0338909 A1 | 12/2013 | Garcia de Blanes et al. |
| 2013/0338910 A1 | 12/2013 | Vilaplana et al. |

OTHER PUBLICATIONS

European Search Report, dated Dec. 20, 2012, regarding Application No. EP12382208.2, 15 pages.

Partial European Search Report, dated Dec. 18, 2012, regarding Application No. EP12382206.6, 10 pages.

European Search Report, dated Dec. 20, 2012, regarding Application No. EP12382209.0, 11 pages.

European Search Report, dated Dec. 20, 2012, regarding Application No. EP12382210.8, 16 pages.

Bertsimas et al., "Fairness in Air Traffic Flow Management," Proceedings of the INFORMS Annual Meeting, Vo. 32, No. 4, Oct. 2009, 27 pages.

Casado, "Application of the Theory of Formal Languages to the Modeling of Trajectory Uncertainty and the Analysis of its Impact in Future Trajectory-Based Operations," First SESAR Innovation Days, Nov. 2011, 1 page. Retrieved May 2, 2013, http://sesarinnovationdays.eu/files/Posters/SID%202011%20Enrique%20Casado.pdf.

Del Pozo De Poza et al., "Assessing Fairness and Equity in Trajectory Based Operations," Proceedings of the 9th AIAA Aviation Technology, Integration, and Operations Conference (ATIO), Sep. 2009, 18 pages.

Galdino et al., "Formal Verification of an Optimal Air Traffic Conflict Resolution and Recovery Alogrithm," Lecture Notes in Computer Science, vol. 4576, Proceedings of the 14th International Workshop on Logic, Language, Information, and Computation (WoLLIC 2007), Jul. 2007, pp. 177-188.

Gallo, "Prediction of Descent Trajectories Based on Aircraft Intent," Proceedings of the 29th IEEE/AIAA Digital Avionics Systems Conference (DASC), Oct. 2010, 16 pages.

Hagen et al., "Stratway—A Modular Approach to Strategic Conflict Resolution," Proceedings of the 11th AIAA Aviation, Technology, Intergration, and Operations (ATIO) Conference, Sep. 2011, 13 pages.

Jonker et al., "Efficiency and Fairness in Air Traffic Control," Proceedings of the Seventeenth Belgium-Netherlands Conference on Artificial Intelligence (BNAIC 2005), Oct. 2005, 7 pages.

Karr et al., "Experimental Performance of a Genetic Algorithm for Airborne Strategic Conflict Resolution," Proceedings of the AIAA Guidance, Navigation, and Control Conference, Aug. 2009, 15 pages.

Kuchar et al., "A Review of Conflict Detection and Resolution Modeling Methods," IEEE Transactions on Intelligent Transportation Systems, vol. 1, No. 4, Dec. 2000, pp. 179-189.

Lopez et al., "Towards an Open Test bed for the Study of Trajectory Synchronization in the Future ATM System: The ASIS Initiative," Proceedings of the 2009 Integrated Communications, Navigation, and Surveillance Conference (ICNS '09), May 2009, 14 pages.

Prandini et al., "A Probabilistic Approach to Aircraft Conflict Detection," IEEE Transactions on Intelligent Transportation Systems, vol. 1, No. 4, Dec. 2000, pp. 199-220.

Pourtaklo et al., "Equitable Allocation of Enroute Airspace Resources," Proceedings of the Eighth USA/Europe Air Traffic Management Research and Development Seminar (ATM2009), Jun. 2009, 8 pages.

Ranieri et al., "STREAM—Strategic Trajectory de-confliction to Enable seamless Aircraft conflic Management," First SESAR Innovation Days, Nov. 2011, 8 pages.

Soomers et al., "Fairness in the Aircraft Landing Problem," Proceedings of the 2008 AGIFORS Anna Valicek Medal Competition, Jun. 2008, 19 pages.

Valenzuela et al., "Conflict Resolution in Converging Air Traffic Using Trajectory Patterns," Journal of Guidance, Control, and Dynamics, vol. 34, No. 4, Jul.-Aug. 2011, pp. 1172-1189.

Vilaplana, "Intent Synchronization," Eurocontrol/FAA Workshop on Avionics for 2011 and Beyond, Oct. 2005, 19 pages. Retrieved May 2, 2013, http://www.ecacnav.com/downloads/13.%20INTENT%20SYNC%202005-10-07%20M%20Vilaplana.pdf.

Vivona et al., "Pattern-Based Genetic Algorithm for Airborne Conflict Resolution," Proceedings of the Aiaa Guidance, Navigation, and Control Conference and Exhibit, Aug. 2006, pp. 316-338.

Wing et al., "Airborne Tactical Intent-Based Conflict Resolution Capability," Proceedings of the 9th AIAA Aviation, Technology, Integration, and Operations (ATIO) Conference, Sep. 2009, 12 pages.

Pallottino et al., "Conflict Resolution Problems for Air Traffic Management Systems Solved with Mixed Integer Programming," IEEE Transactions on Intelligent Transportation Systems, vol. 1, No. 1, Mar. 2002, pp. 3-11.

Office Action, dated Jul. 17, 2014, regarding U.S. Appl. No. 13/902,697, 34 pages.

Office Action, dated Sep. 10, 2014, regarding U.S. Appl. No. 13/902,501, 29 pages.

Del Pozo De Poza, "Conflict Detection and Resolution Using Predicted Aircraft Trajectories", U.S. Appl. No. 13/902,501 and Preliminary Amendment, filed May 24, 2013, 94 pages.

Garcia De Blanes et al., "Conflict Detection and Resolution Using Predicted Aircraft Trajectories", U.S. Appl. No. 13/902,568 and Preliminary Amendment, filed May 24, 2013, 102 pages.

Del Pozo De Poza et al., "Conflict Detection and Resolution Using Predicted Aircraft Trajectories", U.S. Appl. No. 13/902,632 and Preliminary Amendment, filed May 24, 2013, 102 pages.

Vilaplana et al., "Conflict Detection and Resolution Using Predicted Aircraft Trajectories", U.S. Appl. No. 13/902,697 and Preliminary Amendment, filed May 24, 2013, 85 pages.

Office Action, dated Mar. 20, 2014, regarding U.S. Appl. No. 13/902,568, 23 pages.

Notice of Allowance, dated May 20, 2014, regarding U.S. Appl. No. 13/902,568, 5 pages.

Final Office Action, dated Nov. 28, 2014, regarding U.S. Appl. No. 13/902,697, 20 pages.

Notice of Allowance, dated Oct. 10, 2014, regarding U.S. Appl. No. 13/902,501, 8 pages.

Office Action, dated Jan. 7, 2015, regarding U.S. Appl. No. 13/902,532, 54 pages.

Notice of Allowance, dated Mar. 11, 2015, regarding USPTO U.S. Appl. No. 13/902,632, 13 pages.

* cited by examiner

CONFLICT DETECTION AND RESOLUTION USING PREDICTED AIRCRAFT TRAJECTORIES

PRIORITY STATEMENT

This application claims the benefit of EP Patent Application No. 12382207.4, filed on May 25, 2012, the disclosure of which is incorporated herein by reference in its entirety.

This application is related to and incorporates herein by reference in its entirety, co-pending U.S. patent application Ser. No. 13/902,697, concurrently filed and entitled "Conflict Detection and Resolution Using Predicted Aircraft Trajectories" which claims priority to EP Patent Application No. 12382208.2, filed on May 25, 2012.

This application is related to and incorporates herein by reference in its entirety, co-pending U.S. patent application Ser. No. 13/902,568, concurrently filed and entitled "Conflict Detection and Resolution Using Predicted Aircraft Trajectories" which claims priority to EP Patent Application No. 12382206.6, filed on May 25, 2012.

This application is related to and incorporates herein by reference in its entirety, co-pending U.S. patent application Ser. No. 13/902,632, concurrently filed and entitled "Conflict Detection and Resolution Using Predicted Aircraft Trajectories" which claims priority to EP Patent Application No. 12382209.0, filed on May 25, 2012.

FIELD OF THE DISCLOSURE

This disclosure relates to automating the management of airspace. In particular, the present disclosure is concerned with detecting conflicts between aircraft passing through managed airspace, and to resolving the detected conflicts strategically.

BACKGROUND TO THE DISCLOSURE

Air traffic management is responsible for the safe passage of aircraft through an airspace. The aircraft may be manned or unmanned. To do this, a centralised, ground-based air traffic management facility must communicate with aircraft flying through the airspace it manages. This two-way communication may be done in a number of ways, including by oral communication such as by radio or by data communication through a data link or the like.

The aircraft may determine their desired flight path through the airspace, for example using an airborne flight management system, and may then communicate this to air traffic management. In modern times, air traffic management uses sophisticated computer systems to check the submitted flight paths do not result in aircraft trajectories that give rise to conflicts. Conflicts between aircraft arise when their intended trajectories would result in a separation falling below the minimum specified. By trajectory, a four-dimensional description of the aircraft's path is meant such as a time-ordered sequence of aircraft states, including position and altitude. Maintaining safe separations is a particularly demanding task, particularly in congested airspace such as around airports where flight paths tend to converge.

In addition to detecting conflicts, air traffic management must have the means to be able to resolve the conflicts and to communicate the necessary changes in trajectories to the conflicted aircraft.

To date, most efforts aimed at air traffic management's ability to detect and resolve air traffic conflicts have focused on crossing traffic patterns and have not dealt with the more challenging problem of converging traffic. This arises, for example, in arrivals management at TRACON (terminal radar control) facilities, where aircraft arrive from many directions and must be sequenced for approach and landing at an airport. The efforts directed to converging traffic consider maximizing the throughput of traffic on an airspace resource such as a sector or a runway as the main or sole objective when solving air traffic conflicts. Existing solutions also focus on planning the arrival sequence first before detecting and resolving conflicts. The method then proceeds by extrapolating that sequence backwards to the earlier waypoints. However, such an approach only serves to propagate the delay backwards to all other aircraft.

Previous attempts at detecting and resolving conflicts suffer other problems. For example, previous attempts have analysed conflicts in isolation from each other, typically as isolated events between pairs of aircraft. The detected conflicts are resolved in a sequential manner without any consideration of the possibility of a "domino effect" feeding back delays.

Recent advances in predicting aircraft trajectories accurately are of benefit to air traffic management. In particular, work on expressing aircraft intent using formal languages provides a common platform for the exchange of flight information and allows different interested parties to perform trajectory calculations. For example, this aids the communication of planned trajectories between aircraft and air traffic management.

EP patent application 07380259.7, published as EP-A-2, 040,137, also in the name of The Boeing Company, describes the concept of aircraft intent in more detail, and the disclosure of this application is incorporated herein in its entirety by reference. In essence, aircraft intent is an expression of the intent of how the aircraft is to be flown. The aircraft intent is expressed using a set of parameters presented so as to allow equations of motion governing the aircraft's flight to be solved. The theory of formal languages may be used to implement this formulation. An aircraft intent description language provides the set of instructions and the rules that govern the allowable combinations that express the aircraft intent, and so allow a prediction of the aircraft trajectory.

Flight intent may be provided as an input to an intent generation infrastructure. The intent generation infrastructure may be airborne on an aircraft or it may be land-based such as an air traffic management facility. The intent generation infrastructure determines aircraft intent using the unambiguous instructions provided by the flight intent and other inputs to ensure a set of instructions is provided that will allow an unambiguous trajectory to be calculated. Other inputs may include preferred operational strategies such as preferences with respect to loads (both payload and fuel), how to react to meteorological conditions, preferences for minimising time of flight or cost of flight, maintenance costs, and environmental impact. In addition, other inputs may include constraints on use of airspace to be traversed.

The aircraft intent output by the intent generation infrastructure may be used as an input to a trajectory computation infrastructure. The trajectory computation infrastructure may be either located with or away from the intent generation infrastructure. The trajectory computation infrastructure may comprise a trajectory engine that calculates an unambiguous trajectory using the aircraft intent and other inputs that are required to solve the equations of motion of the aircraft. The other inputs may include data provided by an aircraft performance model and an Earth model. The aircraft performance model provides the values of the aircraft performance aspects required by the trajectory engine to integrate the equations of motion. The Earth model provides information relating to environmental conditions, such as the state of the atmosphere, weather conditions, gravity and magnetic variation.

SUMMARY OF THE DISCLOSURE

Against this background, and from a first aspect, the present disclosure resides in a computer-implemented method of managing airspace through which a plurality of aircraft are flying.

The method comprises receiving, from the aircraft, user preferred aircraft intent data that unambiguously defines the user preferred trajectory of each aircraft. The user-preferred aircraft intent data may be a description of the aircraft's user-preferred trajectory expressed in a formal language or may be a full description of how the aircraft is to be operated expressed in a formal language that may be used to calculate a corresponding unique trajectory. The description should close all degrees of freedom of motion of the aircraft, and should completely define the configuration of the aircraft (e.g. flaps, speed brakes, undercarriage).

The method further comprises calling an initial conflict detection procedure. This procedure comprises calculating the corresponding user preferred trajectories from the user preferred aircraft intent data. The user preferred trajectories are compared so as to identify one or more conflicts between trajectories and to identify conflicted aircraft predicted to fly the identified conflicting trajectories. In some embodiments of the invention, there are more than one conflict detection procedure, but in other embodiments there is only a single conflict detection procedure. This, the term "initial conflict detection procedure" should be interpreted to cover embodiments comprising a single conflict detection procedure.

The method then comprises calling an initial conflict resolution procedure. This conflict resolution procedure comprises selecting one or more identified conflicts, characterising the selected conflict and responsively revising the user preferred aircraft intent data of one of the aircraft involved in the selected conflict in a way that should remove the conflict. Examples of how the aircraft intent data may be revised responsively are given below. Essentially, the act of characterising a conflict may include determining if one aircraft is a following aircraft that is approaching another, leading aircraft, and revising the aircraft intent data may involve ensuring that the leading aircraft stays safely ahead of following aircraft by adjusting the aircraft intent data of the leading aircraft and/or the following aircraft. For example, the speed of the leading aircraft may be increased or the path of the following aircraft may be lengthened. Although described as the "initial conflict resolution procedure", it may be the only conflict resolution procedure: the term "initial conflict resolution procedure" is used to assist in describing some embodiments of the present invention that have more than one conflict resolution procedure.

The method also comprises sending the revised aircraft intent data to the corresponding conflicted aircraft.

The above method sees aircraft intent data revised to remove conflicts. This may be done in a targeted way to ensure that the conflicts are removed. However, in some embodiments it is preferred to check that all conflicts have been removed. For example, all conflicts may be selected and the user-preferred aircraft intent data of at least one of the conflicted aircraft revised to remove the conflict.

Accordingly, the method may further comprise calling a further conflict detection procedure. This further conflict detection procedure may comprise calculating the corresponding revised trajectories from the revised aircraft intent data, and comparing the user-preferred trajectories from aircraft not subject to revised aircraft intent data and revised trajectories so as to identify one or more conflicts between trajectories. If conflicts are found, the method may comprise identifying still-conflicted aircraft predicted to fly the identified conflicting trajectories.

Also, if conflicts are identified during the further conflict detection procedure, the method may comprise calling a further conflict resolution procedure comprising selecting one or more identified conflicts, characterising the selected conflict and responsively revising the user preferred aircraft intent data or revised aircraft intent data of one of the aircraft involved in the selected conflict in a way that should remove the conflict. The method may then comprise calling the further conflict detection procedure.

If no conflicts are detected, the method may comprise continuing to the step of sending revised aircraft intent data.

Thus, a loop of further conflict resolution and further detection procedures is defined that may be repeated until the user preferred and revised trajectories are conflict free. This loop may be terminated, for example if it is determined that a conflict free set of aircraft intent data cannot be generated. When a further conflict detection procedure fails to identify any conflicts, the revised aircraft intent data may be sent to the corresponding conflicted aircraft.

Characterising the selected conflict may comprise determining the cause of the reduced separation between the conflicted aircraft, and revising the aircraft intent data comprises revising aircraft intent data to reverse the cause. For example, if an aircraft is found to be catching up with a preceding aircraft, the following aircraft may have its aircraft intent data revised to cause its speed to decrease. Alternatively, an aircraft found to be descending towards another aircraft may have its aircraft intent data revised to hold an altitude.

Revising the aircraft intent data may causes at least one of: a change in altitude of one of the conflicted aircraft, a change in speed of one of the conflicted aircraft, or a change in path length of one of the conflicted aircraft optionally by adding or removing one or more waypoints from the path.

Revising the aircraft intent data may be performed by selecting a revision from a set of candidate resolution patterns. For example, a candidate resolution pattern may be selected that is described as targeting a particular characteristic of conflicts. For example, candidate resolution patterns describing an increase in speed or removing waypoints may be described as targeting an aircraft that is being caught up by the following aircraft. As there may be more than one suitable candidate resolution pattern, one of the suitable patterns may be selected at random.

While the selection of candidate resolution patterns may be targeted to reverse the cause of a conflict, the magnitude of the change may be randomly selected. For example, a revision may be made to increase speed, although the magnitude of the change in speed may be randomly generated (optionally, randomly generated within limits e.g. safe operating speeds of the aircraft).

Optionally, the step of responsively revising the user preferred aircraft intent data or revised aircraft intent data in the initial or further conflict resolution procedure further may comprise storing each instance of revised aircraft intent data so as to form a first joint candidate resolution pattern when all conflicts have been removed. The method may then further comprise repeating the steps of calling the initial conflict detection and resolution procedures and, if conflicts are found, calling the further conflict detection procedure so as to form at least a second joint candidate resolution pattern. Then, one of the joint candidate resolution strategies may be selected, and the revised aircraft intent data from the selected joint candidate resolution strategy may be sent to the corresponding conflicted aircraft.

Different criteria may be used for selecting one joint candidate resolution strategy over another. For example, selection may be made dependent upon an evaluation of the total change in path length or time of arrival of the revised trajectories for each joint candidate resolution strategy. Anther possibility is to select one of the joint candidate resolution strategies according to an evaluation of how each joint candidate resolution strategy distributes changes in trajectories between the aircraft or changes in time of arrival between the aircraft. The strategy that distributes revisions most equally or most fairly may be chosen. This allows strategies that revises moderately many trajectories to be favoured over strategies that revise only one or a few trajectories but that revise them considerably.

Hence, a candidate strategy may be chosen dependent upon cost, for example using a mathematical routine using cost functions. For example, the method may comprise calculating the cost of the revised trajectories. The cost may be a measure of how much each revised trajectory differs from the corresponding user-preferred trajectory, for example as a time cost or a distance cost. Hence, choosing a candidate strategy may be based on determining the candidate strategy that spreads the costs most evenly amongst the conflicted aircraft, for example by fairness or equity. A candidate strategy may be chosen that cannot be altered such that one conflicted aircraft's costs decrease without increasing the cost of another conflicted aircraft.

The present disclosure also provides a further computer-implemented method of managing airspace through which a plurality of aircraft are flying.

The method comprises receiving, from the aircraft, user preferred aircraft intent data that unambiguously defines the user preferred trajectory of each aircraft. The user-preferred aircraft intent data may be a description of the aircraft's user-preferred trajectory expressed in a formal language or may be a full description of how the aircraft is to be operated expressed in a formal language that may be used to calculate a corresponding unique trajectory. The description should close all degrees of freedom of motion of the aircraft, and should completely define the configuration of the aircraft (e.g. flaps, speed brakes, undercarriage).

The method further comprises calling an initial global conflict detection procedure. This procedure comprises calculating the corresponding user preferred trajectories from the user preferred aircraft intent data and comparing the user preferred trajectories so as to identify one or more conflicts between trajectories. The comparison of the user preferred trajectories is used to identify conflicted aircraft and to place the conflicted aircraft into conflict dependent networks such that each conflict dependent network contains a set of all aircraft in conflict with each other, either as a directly linked conflict or an indirectly linked conflict.

By indirectly linked conflicts, it is meant pairs of aircraft that are linked via a chain of conflicts. For example, aircraft A and aircraft D are indirectly linked through conflicts if aircraft A is in conflict with aircraft B, aircraft B is in conflict with aircraft C, and aircraft C is in conflict with aircraft D. In this case, aircraft A, B, C and D would all be placed in the same conflict dependent network.

Each conflict dependent network may be populated with some or all of the conflicted aircraft in the airspace in question. A conflicted aircraft may be put into a conflict dependent network, along with other conflicted aircraft that will be in conflict with the first aircraft put into the conflict dependent network. All aircraft that will be in conflict with the first aircraft may be put into the conflict dependent network. This process may then be repeated for all conflicted aircraft in the airspace, i.e. for a new aircraft to be added to an existing conflict dependent network, it must be in conflict with at least one of the aircraft that are already in that network. If the current aircraft is in conflict with one or more aircraft, but none of those aircraft are in an existing conflict dependent network, the current aircraft is put in a new network, along with the aircraft with which it is in conflict. This continues until all conflicted aircraft are in a conflict dependent network.

Thus, as explained above, each network contains all conflicted aircraft that have either a direct or indirect conflict with other conflicted aircraft in the conflict dependent network. Consequently, a conflicted aircraft can only be a member of one and only one conflict dependent network, i.e. the conflict dependent networks are disjoint (non-overlapping) and cover the entire set of conflicted aircraft in the airspace under consideration.

The method further comprises processing the conflict dependent networks in turn and, for each conflict dependent network, calling an initial conflict resolution procedure. This resolution procedure comprises revising the user preferred aircraft intent data of one or more of the conflicted aircraft of the conflict dependent network to produce revised aircraft intent data that will unambiguously define a corresponding revised trajectory in a way that should remove conflicts from within that conflict dependent network. When all conflict dependent networks have been processed in this way, the revised aircraft intent data is sent to the corresponding conflicted aircraft. Thus, conflicts are by considering one conflict dependent network at a time.

Optionally, the method further comprises, during processing of each conflict dependent network, calling a local conflict detection procedure. This procedure may comprise calculating the corresponding revised trajectories from the revised aircraft intent data and comparing the user-preferred trajectories of aircraft in the conflict dependent network not subject to revised aircraft intent data and revised trajectories so as to identify one or more conflicts between trajectories. If conflicts are identified, the comparison of the trajectories may be used to identify the still-conflicted aircraft and to call a further conflict resolution procedure. The further conflict resolution procedure may comprise revising the user-preferred aircraft intent data of one or more of the still-conflicted aircraft of the conflict dependent network to produce revised aircraft intent data in a way that should remove conflicts from within that conflict dependent network, and calling a further local conflict detection procedure.

Thus, the method loops though iterations of local conflict resolution and detection procedures until all conflicts are removed from the conflict dependent network. The terms "local" conflict resolution and detection procedures are used to emphasise the fact that conflicts are processed at the conflict dependent level at this stage.

When all conflicts are removed from the conflict dependent network currently being processed, then the local conflict detection procedure will return a "no conflicts found" result, in which case the method may comprise either continuing to process the next conflict dependent network or, if all conflict dependent networks have been processed, calling a further global conflict resolution procedure.

The further global conflict detection procedure processes all aircraft in the airspace and so considers all conflict dependent networks together. The procedure may comprise calculating the corresponding revised trajectories from the revised aircraft intent data, and comparing the user-preferred trajectories from the aircraft not subject to revised aircraft intent data and revised trajectories from the aircraft subject to revised aircraft intent data so as to identify one or more conflicts between trajectories. If conflicts are detected, the method may comprise calling the local conflict resolution procedure. Optionally, conflicts between aircraft from separate conflict dependent networks may be identified and those conflict dependent networks may be merged prior to calling a new round of local conflict procedures.

Thus, once all conflict dependent networks are found to be conflict free, a global check is made to ensure that revisions to aircraft intent data has not caused aircraft from different conflict dependent networks to come into conflict with each other. If new conflicts are created, then another round of local conflict resolution and detection procedures are launched. As revisions to aircraft intent data may include a random element, the next round may give rise to a solution that removes all conflicts. As noted above, where new conflicts arise, the conflicted conflict dependent networks may be merged into a new single conflict dependent network. The local conflict resolution and detection procedures may then operate on the revised list of conflict dependent networks.

The above methods see all conflicts resolved in each conflict dependent network before processing the aircraft intent data globally. However, in some embodiments this need not be the case. For example, if a conflict is found during the first iteration of the local conflict detection procedure, the method may not call the further conflict resolution procedure but may simply proceed to process the next conflict dependent network. When all conflict dependent networks have been processed, the method may continue to the global conflict detection procedure. This procedure will identify all conflicts remaining within conflict dependent networks and also any new conflicts between different conflict dependent networks, and will then call a new round of local conflict resolution procedures where the conflicts can be addressed.

If no conflicts are detected during the global conflict detection procedure, the method may continue to the step of sending the revised aircraft intent data to the corresponding conflicted aircraft.

Optionally, performing the initial conflict resolution procedure and any further conflict resolution procedures comprises taking the conflict dependent networks in turn in increasing order of the lateness of the earliest occurring conflict within the conflict dependent network. The time of the conflict may be taken as the time that the aircraft first come into conflict, e.g. their separation drops below a minimum allowed. The network with the first occurring conflict may be processed first and then removed from the list of networks to be processed. Then the network from the revised list with the earliest occurring conflict may be processed, and so on.

Performing the initial conflict resolution procedure or any step of performing the further conflict resolution procedure may comprise taking the conflict dependent networks in turn and for each conflict dependent network, selecting one or more identified conflicts from the conflict dependent network, characterising the selected conflict, and responsively revising the user preferred aircraft intent data of one of the aircraft involved in the selected conflict in a way that should remove the conflict.

Characterising the selected conflict may comprise determining the cause of the reduced separation between the conflicted aircraft, and revising the aircraft intent data comprises revising aircraft intent data to reverse the cause.

Revising the aircraft intent data may cause at least one of: a change in altitude of one of the conflicted aircraft, a change in speed of one of the conflicted aircraft, or a change in path length of one of the conflicted aircraft optionally by adding or removing waypoints from the path.

Accordingly, the step of responsively revising the user-preferred aircraft intent data or revised aircraft intent data may be performed by selecting a revision from a set of candidate resolution patterns. The step of responsively revising the user-preferred aircraft intent data or revised aircraft intent data may further comprise storing each instance of revised aircraft intent data so as to form a first joint candidate resolution pattern when all conflicts have been removed. The, the steps of calling the initial conflict detection and resolution procedures may be repeated and, if conflicts are found, the further conflict detection procedure may be called so as to form at least a second joint candidate resolution pattern. The method may further comprise selecting one of the joint candidate resolution strategies and sending the revised aircraft intent data from the selected joint candidate resolution strategy to the corresponding conflicted aircraft.

The method may comprise selecting one of the joint candidate resolution strategies according to an evaluation of the total change in path length or time of arrival of the revised trajectories for each joint candidate resolution strategy. The method may comprise selecting one of the joint candidate resolution strategies according to an evaluation of how each joint candidate resolution strategy distributes changes in trajectories between the aircraft or changes in time of arrival between the aircraft. The step of characterising the selected conflict in the initial or further conflict resolution procedure may comprise determining the cause of the reduced separation between the conflicted aircraft, and revising the aircraft intent data comprises revising aircraft intent data to reverse the cause.

The candidate resolution patterns may include patterns that cause the aircraft intent data to be revised to cause at least one of: an increase in altitude of one of the conflicted aircraft, a decrease in altitude of one of the conflicted aircraft, an increase in speed of one of the conflicted aircraft, a decrease in speed of one of the conflicted aircraft, an increase in path length of one of the conflicted aircraft optionally by adding one or more waypoints to the path, and a decrease in path length of one of the conflicted aircraft optionally by removing one or more waypoints from the path.

The step of responsively revising the user preferred aircraft intent data or revised aircraft intent data in the initial or further conflict resolution procedure may be performed in a partially random manner. For example, selecting a revision from a set of candidate resolution patterns may comprise determining which of the patterns are suitable for removing the selected conflict, and selecting randomly one of the suitable patterns. Optionally, selecting a revision from a set of candidate resolution patterns may comprise determining which of the patterns are suitable for removing the selected conflict, selecting one of the suitable patterns (optionally, in a random manner) and revising a parameter associated with the selected pattern by a random amount.

The present disclosure also extends to a computer apparatus programmed to implement any of the methods described above. The present disclosure also extends to a computer program comprising instructions that when executed on a computer cause the computer to perform any of the methods described above, and to a computer readable medium having stored thereon such a computer program. The present disclosure also extends to an air traffic control apparatus comprising a computer apparatus programmed to implement any of the methods described above.

BRIEF DESCRIPTION OF THE DRAWINGS

In order that the present disclosure may be more readily understood, preferred embodiments will now be described, by way of example only, with reference to the accompanying drawings in which.

DETAILED DESCRIPTION OF THE DISCLOSURE

The present disclosure provides methods and systems that enable a ground-based airspace management system to de-conflict strategically the trajectories of aircraft under its responsibility, regardless of whether the aircraft are manned or unmanned, in any traffic scenario including converging traffic patterns.

System Overview

Figure 1:
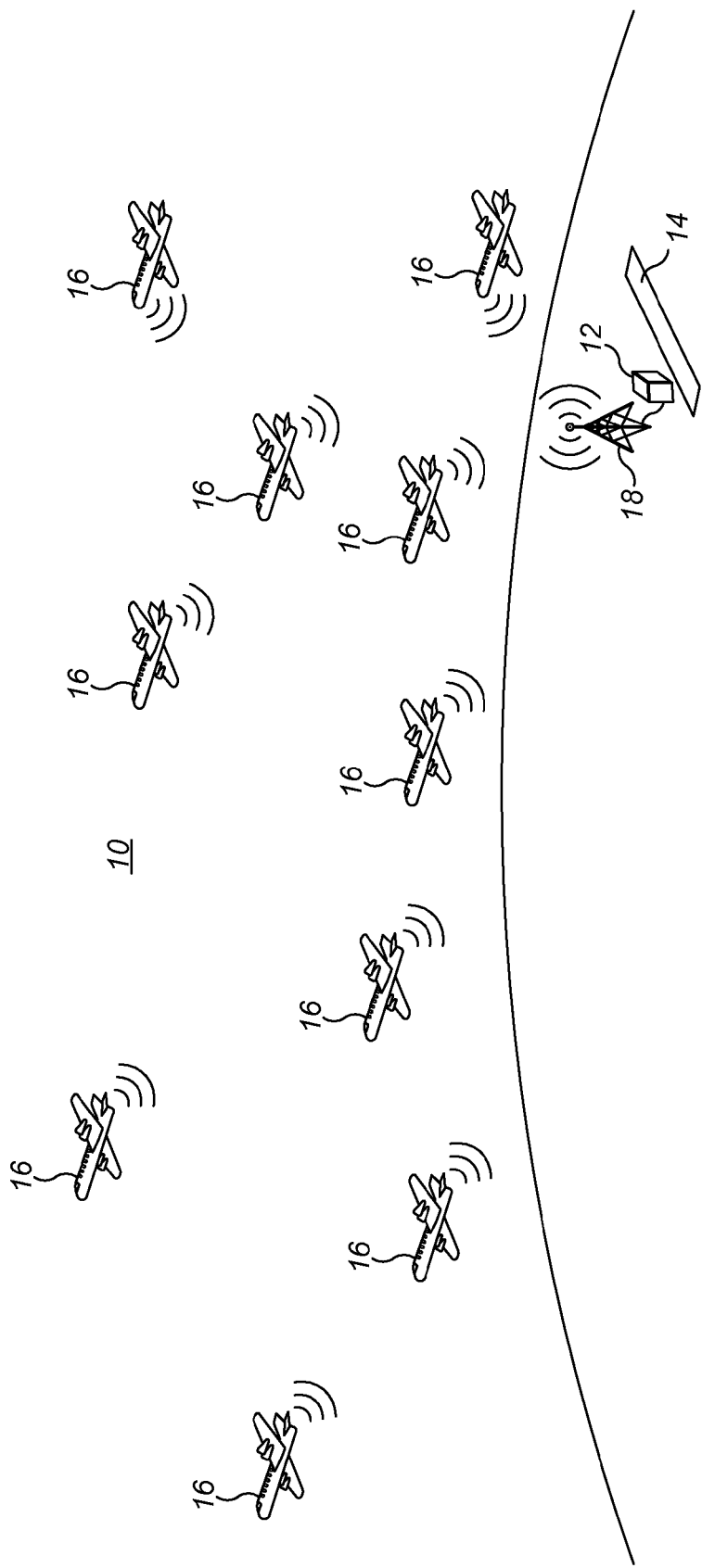
FIG. 1 is a schematic diagram showing aircraft flying within an airspace managed by an air traffic management facility.

FIG. 1 shows schematically an airspace 10 under the control of air traffic management facility 12. In this example, air traffic management 12 is located at an airport 14 and is responsible for aircraft 16 arriving and departing from the airport 14, as well as those aircraft 16 passing through the airspace 10.

Air traffic management 12 is provided with associated communication means 18 to allow two-way communication with the aircraft 16 flying through the airspace 10. The aircraft 16 are equipped with complementary communication equipment (not shown in FIG. 1) of any type well known in the field of aerospace. For example, communication may be effected by radio or could be effected using a data link such as ADS-B.

Communication between air traffic management 12 and each of the aircraft 16 is generally the same, and may be effected either in parallel or serially. A framework illustrating the relationship between air traffic management 12 and one of the aircraft 16 will now be described in more detail. It is to be understood that this framework is common to all the aircraft in the sense that it is the same for any aircraft 16 chosen to be considered.

Figure 2:
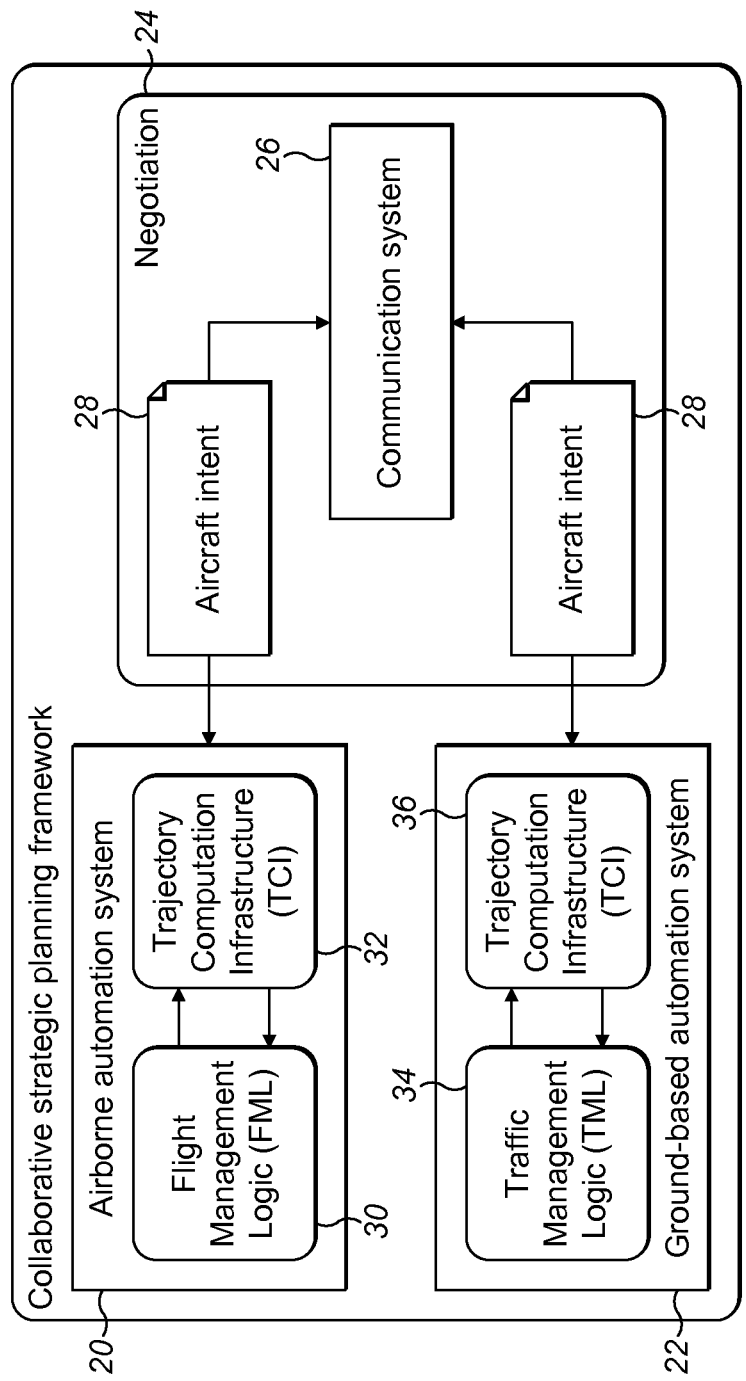
FIG. 2 shows a framework illustrating the relationship between air traffic management and an aircraft flying within the airspace it manages that allows conflict detection and resolution.

FIG. 2 shows schematically the airborne system 20, the ground-based system 22, and the negotiation process 24 that occurs between the airborne system 20 and ground-based system 22. Airborne system 20 is provided by the aircraft 16, and the ground-based system 22 is provided by air traffic management 12. The negotiation process 24 requires a communication system 26 that is distributed between the aircraft 16 and air traffic management 12, namely a transmitter/receiver provided on the aircraft 16 and the communication means 18 provided at the air traffic management facility 12.

In the example of FIG. 2, the communication system 26 is used to exchange aircraft intent data 28 between the airborne automation system 20 and the ground-based automation system 22. The aircraft intent data 28 may be provided by the airborne automation system 20 or by the ground-based automation system 22. The aircraft intent data 28 provided by the airborne automation system 20 will correspond to the user-preferred trajectory of the aircraft 16, whereas the aircraft intent data 28 provided by the ground-based automation system 22 will correspond to a revised trajectory determined by air traffic management 12.

The airborne automation system 20 comprises flight management logic 30 and trajectory computation infrastructure 32. Both these components are computer-implemented, preferably as separate computer systems. For example, the flight management logic 30 may be part of a flight computer of the aircraft 16.

The flight management logic 30 is responsible for following and supervising the negotiation process 24 from the aircraft's point of view. The flight management logic 30 is also responsible for defining the user-preferred aircraft intent data 28 and agreeing the revised aircraft intent 28 with the ground-based automation system 22.

The trajectory computation infrastructure 32 is responsible for computing the trajectory resulting from a given flight intent 28. For example, it may calculate the trajectory arising from a user-preferred aircraft intent for presentation to a pilot for approval before the corresponding user-preferred aircraft intent data 28 is provided to the ground-based automation system 22. Additionally, the trajectory computation infrastructure 32 may generate and display a trajectory corresponding to revised aircraft intent data 28 provided by the ground-based automation system 22 such that the pilot may approve the revised trajectory.

The ground-based automation system 22 comprises traffic management logic 34 and trajectory computation infrastructure 36. Both these components are computer-implemented, preferably as separate computer systems. Although the trajectory computation infrastructure 36 performs a similar function to the trajectory computation infrastructure 32 of the airborne automation system 20, it need not be the same and may be implemented differently.

The traffic management logic 34 is responsible for following and supervising the negotiation process 24. The traffic management logic 34 is also responsible for revising aircraft intents where conflicts arise. To enable revision of the aircraft intents, the traffic management logic 34 has at its disposal algorithms relating to a look ahead process that governs when to run a conflict detection process, to conflict detection and to conflict resolution. In this example, the traffic management logic 34 is modular in its nature such that any of the algorithms may be varied or entirely replaced without affecting the other algorithms. This modularity also makes the traffic management logic 34 ideal as a test bed for developing improved algorithms in that revised versions of the algorithm may be readily swapped in and out of the traffic management logic 34.

The trajectory computation infrastructure 36 is responsible for generating trajectories corresponding to aircraft intents at the ground-based automation system 22. The aircraft intent may be the user-preferred aircraft intent 28 received from the airborne automation system 20 or the revised aircraft intent 28 determined by the traffic management logic 34.

Figure 3:
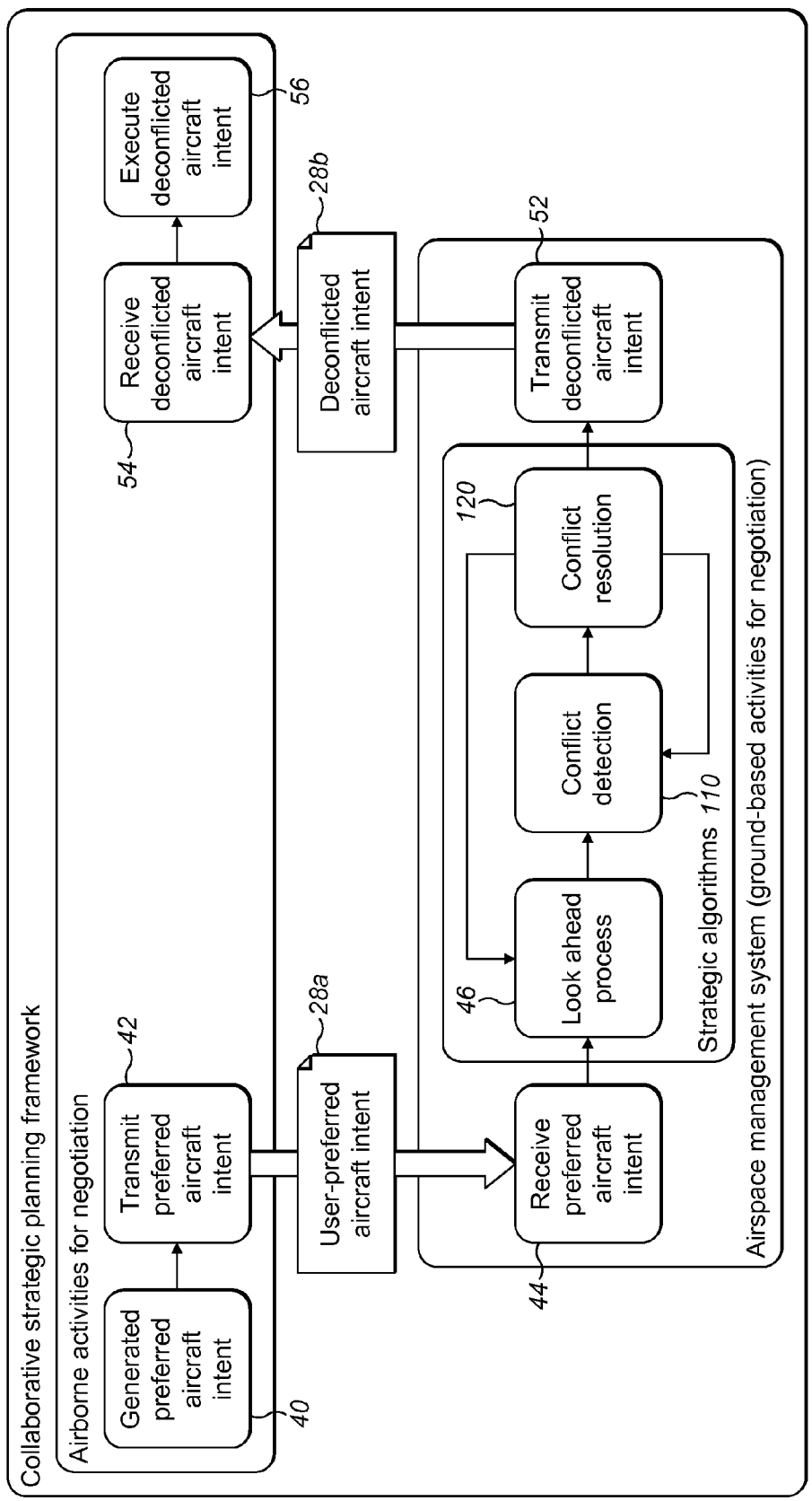
FIG. 3 is a schematic representation of a negotiation process between an aircraft an air traffic management.

The negotiation process 24 defines the type of information to be shared between the airborne automation system 20 and ground-based automation system 22. The negotiation process 24 also defines who is to start communication according to what events, and the sequence of decisions to be followed in order to agree upon a revised aircraft intent 28. FIG. 3 shows the steps of the negotiation process 24, and will now be described in more detail.

In this example, the negotiation process 24 starts on-board the aircraft 16 with the definition of the aircraft's intent that corresponds to a user-preferred trajectory. This is shown in FIG. 3 at 40. The aircraft 16 establishes contact with air traffic management 12 and transmits the user-preferred trajectory information 42 expressed as the user-preferred aircraft intent data 28*a* to air traffic management 12.

Once the user-preferred aircraft intent data 28*a* has been received, the aircraft 16 and air traffic management 12 engage in a one-to-one negotiation process. During the negotiation process 24, the user-preferred aircraft intent data 28*a* submitted by the aircraft 16 is used by the trajectory computation infrastructure 36 to produce the corresponding trajectory. This user-preferred trajectory is analyzed by the traffic management logic 34 in order to detect potential conflicts with other aircraft trajectories.

When conflicts are detected, the airborne automation system 20 and the ground-based automation system 22 will follow the predetermined negotiation protocol required by the negotiation process 24 to agree on trajectory modifications to remove the conflict. The negotiation process 24 includes exchange of trajectory information as the aircraft intent data 28 and, as this is a common characteristic to all possible negotiation protocols, it advantageously allows the protocols to be interchangeable.

Once the user-preferred aircraft intent data 28*a* has been received by air traffic management 12 as shown at 44 in FIG. 3, the negotiation process 24 continues with a look-ahead process at 46. The look-ahead process 46 operates to determine when to launch a conflict detection process 110 and which aircraft (and their trajectories) have to be included in that process. Different look-ahead processes 46 may be implemented as long as pre-established interfaces are maintained.

The look-ahead process 46 may run the conflict detection process 110 periodically. The rate of repetition may be varied, for example according to the volume of air traffic. In addition or as an alternative, the conflict detection process 110 may be invoked whenever a new aircraft enters the managed airspace. Further details are given below.

Once the look-ahead process 46 decides which aircraft 16 are going to be included in the conflict detection process 110, the conflict detection process 110 is launched. Here, as well, different conflict detection processes 110 may be implemented as long as the pre-established interfaces are maintained. In summary, the conflict detection process 110 computes the user-preferred trajectories corresponding to the user-preferred aircraft intent data 28*a* received, and analyses the trajectories computed to identify potential conflicts. When any conflicts are identified by the conflict detection process 110, the conflict resolution process 120 is launched.

The conflict resolution process 120 performs calculations to revise the user-preferred aircraft intent data 28*a* to generate revised aircraft intent data 28*b*. The revised intents result in corresponding revisions to the user-preferred trajectories in order to remove the identified conflicts. Different conflict detection processes 110 may be implemented as long as the pre-established interfaces are maintained.

As will be explained below, the conflict resolution process 120 calls the conflict detection process 110 to analyse the revised trajectories resulting from the revised aircraft intent data 28*b* it proposes to ensure that no conflicts remain and that no new conflicts are generated. Once it is confirmed that no conflicts arise, the revised aircraft intent data 28*b* are transmitted to the affected aircraft 16 by air traffic management 12, as shown at 52 in FIG. 3.

The revised aircraft intent data 28*b* are received by the aircraft 16 under the current consideration, as shown at 54. The aircraft 16 may generate a corresponding revised trajectory. In some embodiments, the aircraft 16 is obliged to follow the revised trajectory defined by the revised aircraft intent data 28*b*. In other embodiments, including the embodiment currently being described, the aircraft 16 is given the option of rejecting the revised aircraft intent data 28*b*. In this case a further round of negotiation is required or, if time does not allow, the aircraft 16 may be commanded to accept the revised trajectory by the ground-based automation system 22. The further round of negotiation may see a new set of revised aircraft intent data 28*b* sent to the aircraft 16 for review of the corresponding new revised trajectory. If improved aircraft intent data 28*b* cannot be found, or if computation time for the negotiation process runs out, the ground-based automation system 22 may command the aircraft 16 to follow the original aircraft intent data 28*b*. In any event, once the revised aircraft intent data 28*b* is accepted and the corresponding trajectory is executed by the aircraft 16 as shown at 56. As will be appreciated, the conflict detection and resolution process is a dynamic process, and so further changes may be imposed on the trajectory as it is executed by the aircraft 16.

Conflict Detection and Resolution Overview

Methods of detecting and resolving conflicts in predicted aircraft trajectories are now described. These methods ensure that the resolved trajectories do not result in further conflicts downstream, hence avoiding a "domino effect" of conflicting trajectories propagating backwards through the chain of aircraft.

Figure 4:
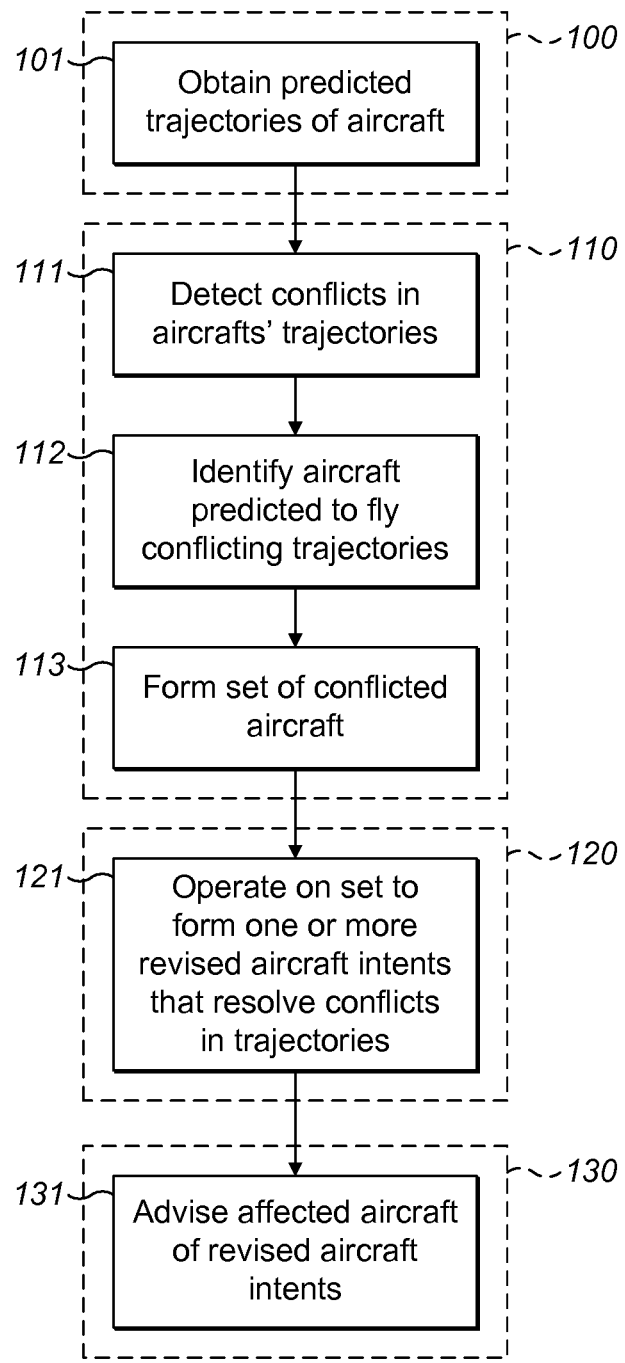
FIG. 4 is a flow chart representation of a method of detecting and resolving conflicts according to an embodiment of the present invention.

The overall conflict detection and resolution process may be envisaged as a two-stage process of firstly detecting conflicts and secondly resolving the conflicts. This is illustrated in FIG. 4 by the dashed boxes 110 and 120. Generally, an initial stage of obtaining user-preferred trajectories of aircraft 16 is performed, as shown by dashed box 100 in FIG. 4. Also, a final stage of advising aircraft 16 of revised aircraft intent data 28*b* is generally performed, as indicated by dashed box 130 in FIG. 4. A more detailed description of the fuller four-stage method of FIG. 4 will now be provided.

The method of FIG. 4 may be practised by a ground-based automation system 22 hosted at an air traffic management facility 12, for example using a network of computers located at the facility 12, as described above. Air traffic management 12 will assume responsibility for the safe passage of aircraft through the airspace 10 that it manages. The method starts at 101 where user-preferred trajectories of the aircraft 16 flying through the managed airspace 10 are obtained. This may be done in several different ways. For example, a description of the user-preferred trajectories may be provided. Alternatively, the trajectories may be calculated and hence predicted as part of the method. A description of an aircraft's user-preferred intent data 28*a* may be provided, for example expressed using a formal language, as shown at 28 in FIG. 2. Air traffic management 12 may then use this user-preferred aircraft intent data 28*a* to calculate a user-preferred trajectory for the aircraft 16.

With the trajectory prediction process 100 complete, the method moves to the conflict detection process 110. At step 111, aircraft trajectories are compared and conflicts identified. This process is described in more detail below. At 112, the aircraft 16 predicted to fly conflicting trajectories are identified and these aircraft are nominally placed into a set of conflicted aircraft at step 113.

The method then progresses to the conflict resolution process 120. At step 121, the set of aircraft formed at step 113 is used. The user preferred aircraft intent data 28a of aircraft identified within the set of conflicted aircraft are adjusted and the corresponding trajectories are calculated to identify one or more instances where all conflicts are resolved.

Once the conflicts are resolved, the method may progress to process 130 where conflicted aircraft 16 are advised of their revised aircraft intent data 28b. This may involve sending a description of the associated aircraft intent such that the aircraft 16 may then calculate the corresponding trajectory or it may involve transmitting a description of the new trajectory to the aircraft 16. The former example was described above. As a description of aircraft intent is by definition a set of instructions that unambiguously define a trajectory, it is assured that the aircraft 16 will generate the intended trajectory.

As will be appreciated, the above method will be performed repeatedly by air traffic management 12. This accounts for variable conditions that may otherwise affect the calculated trajectories. For example, unexpected winds may give rise to conflicts that were not previously predicted. Repetition of the method may also be used to check that aircraft 16 are indeed following the user-preferred trajectories and that the airspace remains free of predicted conflicts. Although the rate of repetition may be varied, as an example the method may be repeated at set intervals of every thirty seconds. In addition or as an alternative, the method may be invoked whenever a new aircraft 16 enters the managed airspace 10. As well as including all aircraft 16 within the managed airspace 10, the method may also consider aircraft 16 approaching the airspace 10.

Figure 5:
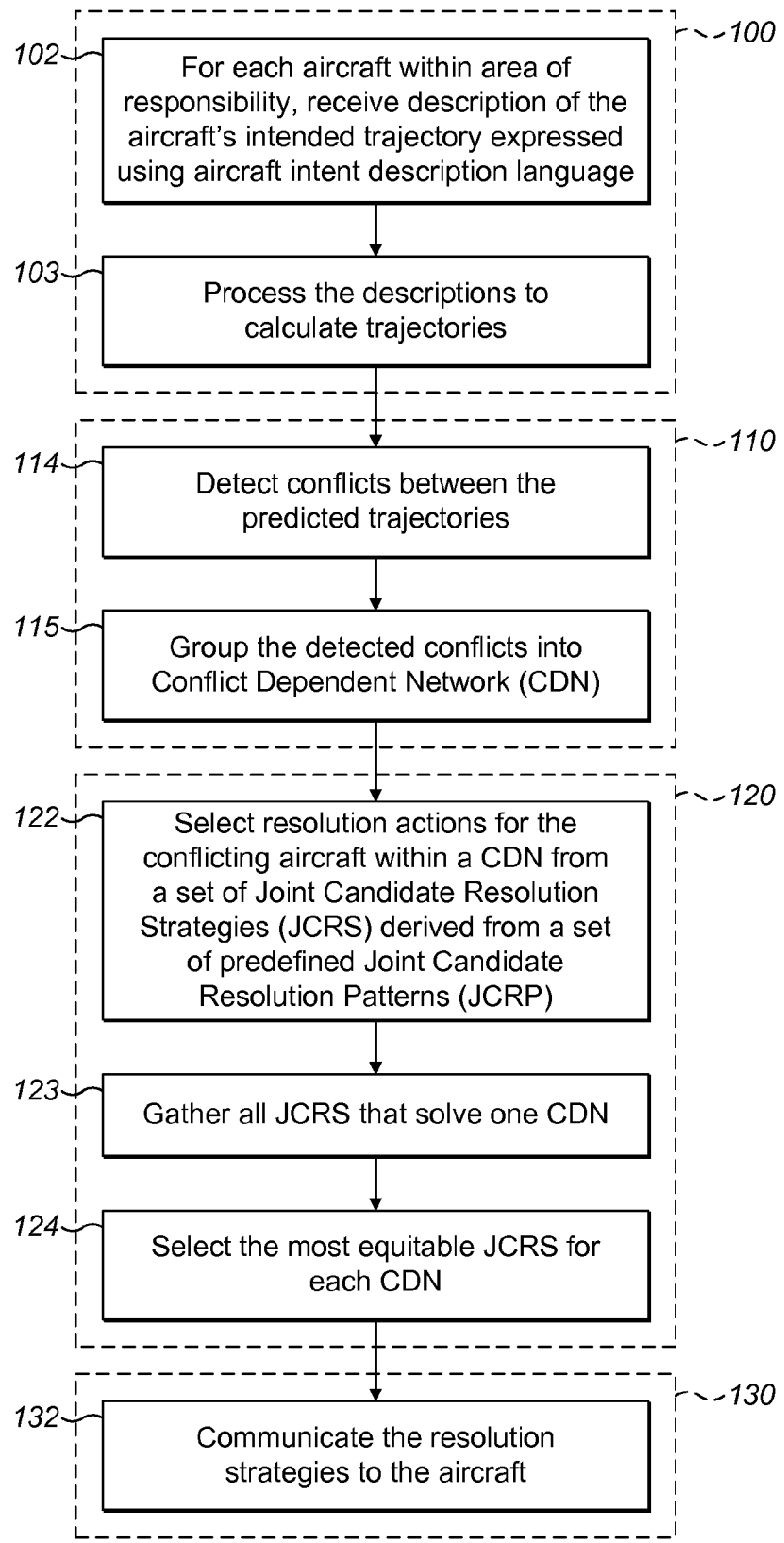
FIG. 5 is a flow chart representation of a method of detecting and resolving conflicts according to another embodiment of the present invention.

FIG. 5 shows another method of managing an airspace 10, including detecting and resolving trajectories of aircraft 16, according to an embodiment of the present invention. According to the embodiment of FIG. 2, the method is integrated in a ground-based automation system 22 and works as follows.

At 102, the traffic management logic 34 of the ground-based automation system 22 receives a description of the user-preferred trajectories of the aircraft within its area of responsibility. The trajectories are described by the user-preferred aircraft intent data 28a expressed using an aircraft intent description language.

At 103, the traffic management logic 34 sends the user-preferred aircraft intent data 28a to the trajectory computation infrastructure 36 that processes those data and predicts the corresponding user-preferred trajectories.

At 114, possible conflicts are identified, i.e. instances where the separation between user-preferred trajectories are in violation of established minimum distances between the aircraft 16.

At 115, the detected conflicts are grouped into conflict dependent networks. Each network includes all aircraft 16 in conflict with at least one other aircraft 16 within the network. For example, if aircraft A1 conflicts with aircraft A2, and aircraft A2 conflicts with aircraft A3 and A4 and aircraft A4 conflicts with aircraft A5, a conflict dependent network is formed containing aircraft A1, A2, A3, A4 and A5. All aircraft 16 within the network have conflict dependencies on the trajectories of all the other aircraft 16 in the network, either directly or indirectly. A consequence of these types of networks is that any particular aircraft 16 can be a member of only one conflict dependent network.

At 120, the conflicts are resolved "network-wise", i.e. considering simultaneously all conflicts in a conflict dependent network. In this way, the implications of the resolution actions on other conflicts within the network are taken into account from the outset. The resolution actions are the actions needed to be taken by an aircraft 16 to avoid the conflict. These actions are designed as amendments to the user-preferred aircraft intent data 28a that produce revised trajectories.

As indicated at 122, the resolution actions for the conflicting aircraft within a conflict dependent network are selected from a set of joint candidate resolution strategies (JCRS). The joint candidate resolution strategies are derived from a set of predefined joint candidate resolution patterns (JCRP). The selection is carried out so that the selected joint candidate resolution strategy belongs to a set of Pareto-optimal joint candidate resolution strategies. This set of joint candidate resolution strategies that solve each conflict dependent network are gathered together at step 123. Pareto optimality in this context may be defined in different ways. For example, it may relate to the changes in flight times or it may relate to a joint cost function capturing the additional operating costs, resulting from the resolution actions as applied across all the aircraft 16 in the conflict dependent network. Thus, the resolution actions in the selected joint candidate resolution strategy are such that the aircraft 16 belonging to the same conflict dependent network share the consequences of the trajectory modifications required to resolve the conflicts. For example, the strategy that sees more, shorter delays spread across more aircraft 16 may be preferred to a strategy that sees fewer, larger delays applied to only a few aircraft 16. At step 124, the optimum joint candidate resolution strategy is selected for each conflict dependent network.

Once the joint candidate resolution strategy has been selected, the aircraft 16 whose trajectories have been amended are identified and the revised aircraft intent data 28b are communicated to the affected aircraft 16, as indicated at 132.

In this way, it is possible to solve the problem of resolving air traffic conflicts strategically in a trajectory-based operational environment by sharing consequences of changes resulting from the resolution of the conflicts among all aircraft involved.

Figure 6:
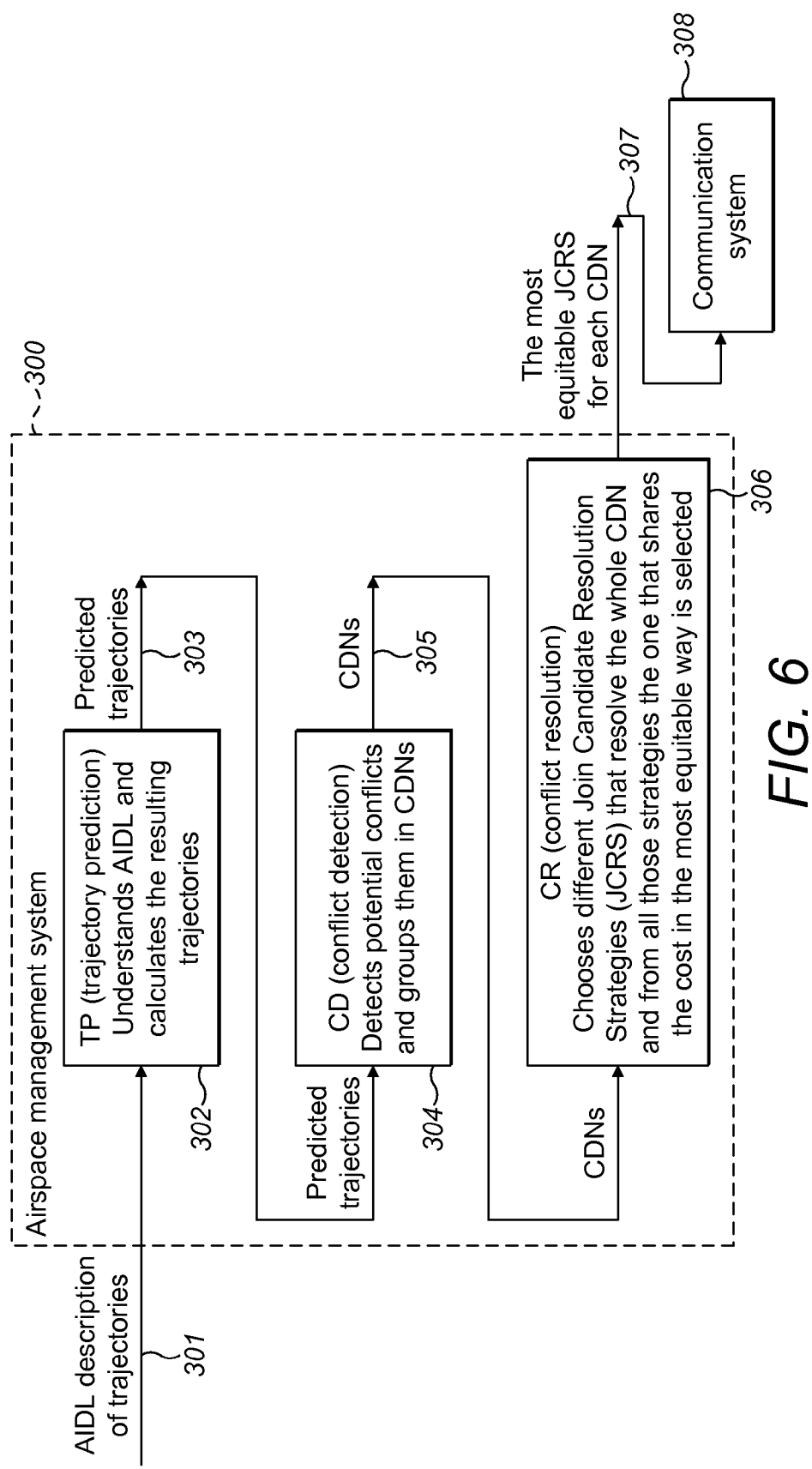
FIG. 6 is a flow chart representation of a system for detecting and resolving conflicts according to an embodiment of the present invention.

FIG. 6 shows a further embodiment of a ground-based automation system 300, that may be used to implement the method of FIG. 4 or FIG. 5. The ground-based automation system 300 comprises three sub-systems, namely a trajectory prediction module 302, a conflict detection module 304 and a conflict resolution module 306.

The ground-based automation system 300 receives as an input a description of the trajectories of the aircraft expressed as user-preferred aircraft intent data 28a using an aircraft intent description language (AIDL), as indicated at 301.

The trajectory prediction module 302 calculates the user-preferred trajectories and provides them as output 303. The user-preferred trajectories 303 are taken as an input by the conflict detection module 304.

The conflict detection module 304 uses the user-preferred trajectories to detect conflicts and to group the conflicts into conflict dependent networks, as has been described above. The conflict detection module 304 provides the conflict dependent networks as an output 305 that is provided to the conflict resolution module 306.

The conflict resolution module 306 operates on the conflict dependent networks to produce joint candidate resolution strategies for each conflict dependent network, and outputs a joint candidate resolution strategy at 307. This joint candidate resolution strategy is used to determine the data to be sent to affected aircraft by a communication system 308. Although the communication system 308 is shown as being separate to the ground-based automation system 300, it may be a part of the ground-based automation system 300. For example, the modules 302, 304 and 306 and, optionally, the communication system 308 may be provided as a computer system. The computer system may comprise a single server, a plurality of servers and may be provided at a single location or as part of a distributed network.

As noted above, the two key processes in the method are the conflict detection process 110 and the conflict resolution process 120. Each of these processes will now be described in more detail.

Conflict Detection

Figure 7:
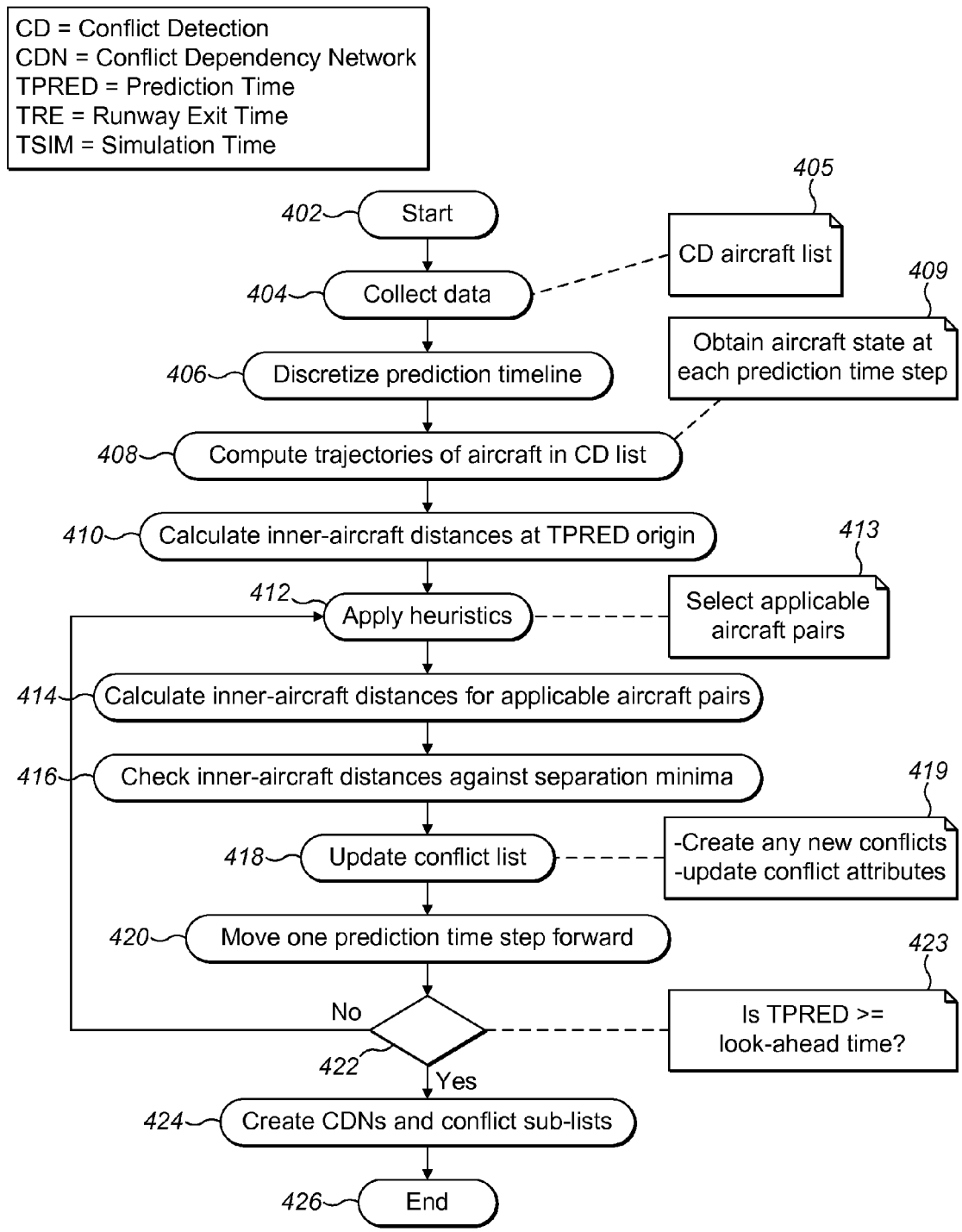
FIG. 7 is a flow chart representation of a conflict detection process.

FIG. 7 shows the steps involved in a preferred form of the conflict detection process 110. FIG. 7 shows the process 110 starting at 402. At step 404, data is collected. Specifically, a conflict detection (CD) list of aircraft 405 is compiled. The aircraft list 405 to be considered by the conflict detection process is the list of aircraft 405 known at the time when the conflict detection and resolution processes are launched.

Each aircraft 16 in the aircraft list 405 must have associated certain pieces of information that are required to carry out the conflict detection process 110. These pieces of information are referred to as conflict detection attributes, and are initially provided together with the aircraft list 405. The conflict resolution process 120 may in turn alter the conflict detection attributes when subsequently calling the conflict detection process 110 in order to verify whether the revised aircraft intent data 28b and the corresponding revised trajectories are indeed conflict free. The main conflict detection attributes are described below.

Type: each aircraft 16 in the list 405 is marked as either available or unavailable, referred to hereinafter as "unlocked" or "locked". An aircraft 16 has a preferred trajectory that it would like to fly. That trajectory is expressed as the aircraft intent or, in other words, how the aircraft would like to fly that trajectory. If that intention to fly can still be changed, this means the aircraft 16 and air traffic management 12 have not yet agreed to it, in which case the aircraft is available or unlocked. If it cannot be changed, the aircraft 16 is unavailable or locked.

Initial conditions: the available aircraft 16 have associated an estimated time and aircraft state at sector entry (i.e. at the time of entering the managed airspace 10). These data represent the predicted initial conditions of the aircraft 16 at sector entry and these conditions are the starting point for the predictions and search for conflicts.

Current aircraft intent: the current aircraft intent of an unlocked aircraft may be that aircraft's user-preferred aircraft intent 28a, or a revised aircraft intent 28b resulting from a previous conflict detection and resolution process.

At 406, the timeline of the current conflict detection and resolution process is discretized.

Next, at 408, the conflict detection process 110 calls a trajectory predictor (TP) of the trajectory computation infrastructure 36 to predict the trajectories within its sector for all the aircraft 16 in the aircraft list 405 from the current simulation time forward. The inputs to the trajectory computation process are the initial conditions and the current aircraft intent 28 provided as the aircraft's conflict detection attributes. This provides the aircraft state at each prediction time step for all aircraft 16, as indicated at 409.

Once the trajectory predictions are available, the conflict detection process 110 starts calculating the evolution of the inter-aircraft distances for all possible aircraft pairs along the prediction timeline. In this embodiment, the term inter-aircraft distance refers to the shortest distance over the Earth's surface between the ground projections of the position of two aircraft 16. Inter-aircraft distance is used because it is assumed that aircraft 16 must maintain horizontal separation at all times and that, consequently, the separation minima applicable are expressed in terms of inter-aircraft distance, e.g. radar separation or wake vortex separation. Thus, a conflict occurs when the predicted inter-aircraft distance between two aircraft 16 falls below the applicable minimum during a certain time interval. The conflict detection process 110 has access to a database containing the applicable minima, which are inter-aircraft distance values that must not be violated. These minima may depend on the aircraft type, and the relative position of the aircraft 16 (e.g. wake vortex separation may prevail between aircraft 16 following the same track, but not between aircraft 16 on converging tracks). During this process, regard may be paid to the vertical separation of aircraft 16, e.g. to allow reduced horizontal separation where the vertical separation is sufficient to allow this.

The conflict detection process 110 starts at step 410 where the inter-aircraft distances are calculated for the initial conditions, i.e. the origin of the timeline. Next, at step 412, all possible pairs of aircraft 16 are formed as shown at 413, and heuristics are applied to each pair of aircraft 16. At each time step, the conflict detection process 110 applies some heuristics before calculating the inter-aircraft distances, in order to skip aircraft pairs that, given the prior evolution of their inter-aircraft distance and their relative positions, cannot possibly enter into a conflict during the current time step. In addition, other heuristics will be in place to accelerate the calculation of the inter-aircraft distances and the comparison with the applicable minima.

Once the heuristics have been applied, the remaining aircraft pairs have their inter-aircraft distances calculated at 414. These inter-aircraft distances are checked against the applicable separation minima at 416. At 418, the list of conflicts is updated with the newly identified conflicts. This step includes creating the new conflicts in the list and updating associated attributes, as shown at 419.

Once step 418 is complete, the conflict detection process 110 can proceed to the next time step, as shown at 420. A check is made at step 422 to ensure that the next time step is not outside the prediction window as indicated at 423 (i.e. the conflict detection process will look forward over a certain time window, and the time steps should move forward to cover the entire window, but should not go beyond the window). Provided another time step is required, the conflict detection process 110 loops back to step 412 where heuristics are applied for the next time step.

In this way, the conflict detection process 110 proceeds along the prediction time line, from the start to the end of the prediction window, calculating the inter-aircraft distance between all possible aircraft pairs at each time step. The conflict detection process 110 is able to identify all conflicts between the aircraft 16 in the aircraft list 405 between the start and end of the prediction timeline. The conflict detection process 110 compiles the identified conflicts into a conflict list, where each conflict is associated with the following pieces of information, denoted as conflict attributes.

Conflicting aircraft pair: identifiers of the two conflicting aircraft 16, together with their conflict detection attributes.

Figure 8A:
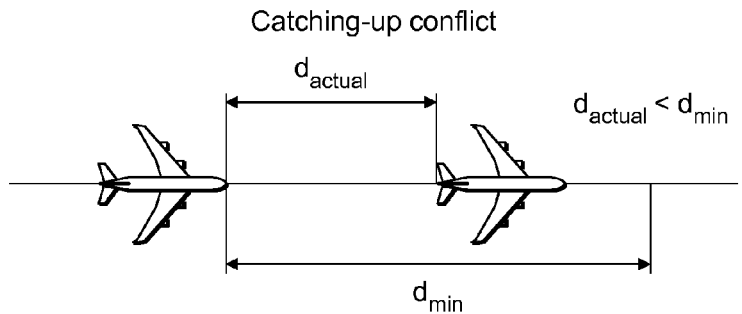
FIGS. 8a and 8b show two examples of conflicting trajectories.
Figure 8B:
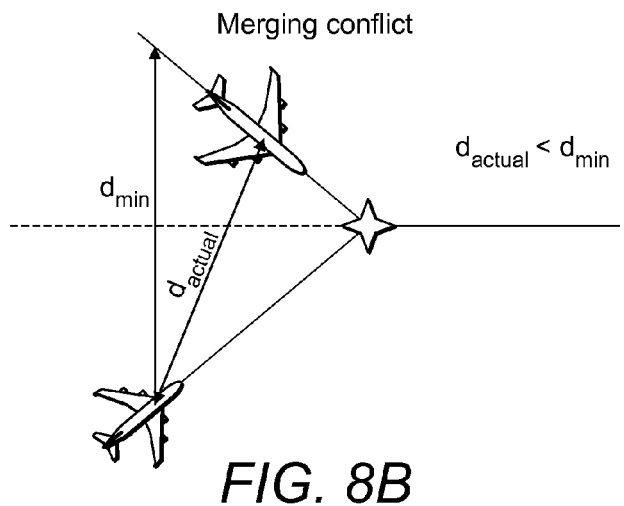

Conflict type: an identifier associated to the type of conflict. In this particular embodiment, only two types of conflicts can occur. The first type, catching-up conflicts, is shown in FIG. 8a where the loss of separation occurs between aircraft 16 flying along the same track, i.e. their separation dactual falls below the minimum separation allowed dmin. The second type, merging conflicts, is shown in FIG. 8b where the loss of separation takes place between two aircraft 16 on converging tracks as they approach the merging point, i.e. their separation dactual falls below the minimum separation allowed dmin.

Conflict interval: the time interval, in the prediction timeline, during which the inter-aircraft distance is below the applicable minimum.

Conflict duration: the length, in time steps, of conflict interval, i.e. the number of times steps during which the inter-aircraft distance is below the applicable minimum.

Conflict intensity: this attribute is a value between 0 and 10 that provides a measure of the severity of the conflict (with 0 being the lowest level of severity and 10 the highest). The conflict intensity is a function of the minimum predicted inter-aircraft distance during the conflict and is calculated taking into account the proportion of the applicable minimum violated by that minimum distance. For example, a minimum predicted separation of 2 miles will result in a conflict intensity of 4.0 when the applicable minimum is 5 miles, and 6.7 when the applicable minimum is 3 miles.

Aircraft intent instructions associated with the conflict: the conflict detection process 110 associates the set of aircraft intent instructions that are active for each of the two conflicting aircraft during the conflict interval.

Subsequently, at 424, the identified conflicts are grouped into conflict dependent networks according to an equivalence relation (called the conflict dependency relation) that is defined over the set of conflicting aircraft 16. This equivalence relation is in turn based on another relation defined over the set of conflicting aircraft 16, namely the conflict relation ('A belongs to the same conflicting pair as B'), which establishes that an aircraft A1 is related to an aircraft A2 if they are in conflict with each other (or they are the same aircraft). The conflict relation is not an equivalence relation, as it does not have the transitive property (if A1 is in conflict with A2 and A2 is in conflict with A3, A1 is not necessarily in conflict with A3). The conflict dependency relation is based on the conflict relation as follows: two aircraft 16 are considered related (equivalent) according to the conflict dependency relation if it is possible to connect them by means of a succession of conflict relations. It is easy to check that this relation fulfils the three properties of equivalence: reflexive, symmetric and transitive.

As an example, let us consider an aircraft A1 anticipated to enter in conflict with two different aircraft, A2 and A3, during a certain segment of its trajectory. In addition, let us assume that A3 will also come in conflict with another aircraft, A4. As a result, the following conflicts (conflict relations) will take place: A1-A2, A1-A3 and A3-A4. From these conflict relations it can immediately be seen that A1 is equivalent to A2 and to A3 and that A3 is equivalent to A4. In addition, by the transitive property A2 is equivalent to A3 (applying the conflict dependency relation: A2 is in conflict with A1, which is in conflict with A3), A1 is equivalent to A4 (applying the conflict dependency relation: A1 is in conflict with A3, which is in conflict with A4) and A2 is equivalent to A4 (applying the conflict dependency relation: A2 is in conflict with A1, which is in conflict with A3, which is in conflict with A4). Thus, the four aircraft 16 belong to the same equivalence class. The elements of an equivalence class are equivalent, under the equivalence relation, to all the others elements of the same equivalence class. Any two different equivalence classes in a non-empty set are disjoint and the union over all of the equivalence classes is the given set.

In the present context, the equivalence classes defined by the conflict dependency equivalence relation are the conflict dependency networks mentioned previously. It will now be understood that the aircraft 16 belonging to each conflict dependent network are interconnected through conflict dependency relations. Considering the properties of equivalence relations, conflict dependent networks are disjoint, i.e. two aircraft 16 cannot belong to two conflict dependent networks simultaneously. In the example above, A1, A2, A3 and A4 form a conflict dependent network.

Considering the above, the conflict detection process 110 first groups the conflicting aircraft 16 into conflict dependent networks at 424 (using the information in the conflict list), and then groups the conflicts between the aircraft 16 in each conflict dependent network into a conflict sub-list. The conflict list contains as many sub-lists as there are conflict dependent networks. Analogously to the conflict dependent networks, conflict sub-lists are disjoint and their union is the conflict list. Finally, the conflict detection process 110 orders the conflicts in each sub-list chronologically (earlier conflicts first) based on the first time step at which the applicable minimum is first violated (the start of the conflict interval).

Conflict Resolution

Completion of the conflict detection process 110 causes the conflict resolution process 120 to be called. The conflict detection process 110 provides the conflict resolution process 120 with the conflict list organized as a set of conflict sub-lists, each corresponding to a conflict dependent network.

The conflict resolution process 120 modifies the current aircraft intent data 28 of at least some of the conflicting aircraft 16 so that the resulting trajectories are predicted to remain conflict-free and as efficient as possible. The conflict resolution process 120 only alters the aircraft intent data 28 of the unlocked aircraft 16 in the conflict list. Thus, it is assumed that there can be no conflicts involving only locked aircraft (these conflicts would have been resolved in a previous iteration of the conflict detection and resolution processes).

The conflict resolution process 120, for example in the case of arrival management, measures efficiency on the basis of predicted Runway Threshold Crossing Time (tRT) for the aircraft 16. In particular, the objective of the conflict resolution process 120 is to alter the aircraft intent data 28 in such a way that the resulting estimated value of tRT deviates the least possible from the value that would be obtained with the user-preferred aircraft intent data 28a.

The conflict resolution process 120 operates in a network-wise manner, attempting to get the aircraft 16 belonging to the same conflict dependent network to share equally the delays incurred in resolving the conflicts in which they are involved.

Let us assume that the conflict detection aircraft list 405 contains n aircraft grouped into m disjoint conflict dependent networks. Let us now consider the conflict dependency network $CDN_j = \{A_1^j, \ldots, A_i^j, \ldots, A_{n_j}^j\}$, with $i \in \{1, \ldots, n_j\}$, $j \in \{1, \ldots, m_j\}$ and $$\sum_j n_j = n.$$

All the conflicts in which an aircraft $A_i^j \in CDN_j$ is involved are contained in the conflict sub-list associated to CDNj, denoted as SLj. A Candidate Resolution Strategy (CRS) for an aircraft $A_i^j \in CDN$ is an instance of aircraft intent that, if implemented by $A_i^j$ could potentially result in a conflict-free trajectory for the aircraft 16. In principle, any feasible aircraft intent for $A_i^j$ that is operationally meaningful in the scenario considered could be considered a candidate resolution strategy for that aircraft 16 (including its preferred aircraft intent) since a conflict may be resolved as a result of actions. Candidate resolution strategies are derived from a set of pre-defined candidate resolution patterns (CRPs), which capture the allowable degrees of freedom that the aircraft 16 have at its disposal to resolve conflicts in the scenario considered. Different CRPs target different conflict problems, for example some assist in an aircraft catching up and coming into conflict with an earlier aircraft and some assist in an aircraft falling behind into conflict with a following aircraft. Selection of appropriate CRPs may be made, as is described in more detail below.

A joint candidate resolution strategy (JCRS) for CDNj is a set comprising of nj candidate resolution strategies, each assigned to one of the aircraft in $CDN_j$: $JCRS_j = \{CRS_1^j, \ldots, CRS_i^j, \ldots, CRS_{n_j}^j\}$, with JCRSj denoting a JCRS for CDNj and $CRS_i^j$ denoting a candidate resolution strategy for the aircraft $A_i^j \in CDN_j$. A conflict-free JCRSj is a joint candidate resolution strategy for CDNj that is predicted to result in no conflicts involving the aircraft 16 in CDNj, i.e. SLj would become empty as a result of implementing a conflict-free JCRSj. To check whether a JCRSj is conflict-free, the conflict resolution process 120 must call the conflict detection process 110.

The objective of the conflict resolution process 120 is to design a conflict-free JCRSj that distributes the cost of resolving the conflicts in SLj among the aircraft belonging to CDNj in the most equitable way possible.

It is assumed that the cost incurred by an aircraft $A_i^j$ as a result of implementing a strategy $CRS_i^j$ is measured by the deviation that $CRS_i^j$ causes from the aircraft operator's objectives (for the whole trajectory or a segment). These objectives are captured by the timeline corresponding to the trajectory that results from flying according to the user-preferred aircraft intent and that is denoted as $t_{RT}^{pref}$. Thus, the cost of a candidate resolution strategy $CRS_i^j$ for $A_i^j$ is defined as follows:

$$c(CRS_i^j) = |t_{RT}(CRS_i^j) - t_{RT}^{pref}| \quad (1)$$

where $c(CRS_i^j)$ is the cost of $CRS_i^j$, $t_{RT}(CRS_i^j)$ is the arrival time for aircraft $A_i^j$ that is expected to result from flying $CRS_i^j$.

As it stems from equation (1), the cost of delay and early arrival are considered to be the same. Thus, it is implicitly assumed that it is as costly for the airline to arrive early as to arrive late. The cost function could be adjusted to encode a higher cost of delay versus early arrival. For example, removing the absolute value from $|t_{RT}(CRS_i^j) - t_{RT}^{pref}|$ in (1) would result in early arrivals having a negative cost, which would capture a situation where the airline considers rewarding an early arrival.

Considering the above, the cost of a CRS measures the difference between the arrival time that would result from flying the candidate resolution strategy and those that would result from flying the user-preferred aircraft intent, with the latter being the values preferred by the operator. Thus, the cost of implementing the user-preferred aircraft intent as a CRS is zero, as it would result in no deviation from the user-preferred arrival time.

In light of the above, the resolution of the conflicts in certain conflict sub-lists is cast as a constrained multi-objective optimization problem over the corresponding conflict dependent network. The problem is stated as follows:

$$\text{minimise } c(JCRS_j) = c(CRS_1^j), \ldots, c(CRS_i^j), \ldots, c(CRS_{n_j j}))$$

$$\text{subject to } JCRS_j \in D_j, D \subset X_j \quad (2)$$

where $c(JCRS_j)$ is a vector function, with image in $R^{n_j}$, defined over the set $X_j$, which is the set of all possible joint candidate resolution strategies for $SL_j$. A vector $c(JCRS_j)$ includes the costs derived from each of the candidate resolution strategies contained in $JCRS_j$, a joint candidate resolution strategy for the aircraft 16 in $CDN_j$. $D_j$ denotes the set of conflict-free joint candidate resolution strategies for those aircraft 16. The solution to the problem in (2) would be one (or more) $JCRS_j \in D_j$ that simultaneously minimize, in some appropriate sense, the resolution costs as defined in (1) for all the aircraft 16 in the network.

It is not possible to define a single global optimum for a problem such as the one in (2). Instead, as it is commonly done in multi-objective optimization problems, we will assume that the solution consists of a set of acceptable trade-offs among the costs incurred by the aircraft 16. The set of trade-offs considered is the Pareto set, which comprises of all the Pareto-optimal solutions. A Pareto-optimal solution of (2) is a conflict-free JCRSj that is optimal in the sense that no other conflict-free JCRSj can reduce the cost for an aircraft 16 in CDNj without increasing the cost for at least one other aircraft 16. To characterize mathematically the Pareto set, it is necessary to extend the relational operators =, ≤ and < to the set $Z_j = Im(c(D_j))$, which is the image of Dj on $R^{n_j}$, i.e. $Z_j \subset R^{n_j}$. Thus, $c(JCRS_j) \in Z_j \subset R^{n_j}$. For any two vectors u, $v \in Z_j$, the following relationships are defined:

$$u = v \text{ if } \forall i \in \{1, \ldots, n_j\}: u_i = v_i$$

$$u \leq v \text{ if } \forall i \in \{1, \ldots, n_j\}: u_i \leq v_i$$

$$u < v \text{ if } u \leq v \text{ and } u \neq v \quad (3)$$

Considering the definitions in (3), a conflict-free joint candidate resolution strategy $JCRS_j^*$ is said to be a Pareto-optimal solution to the problem (2) if there is no $JCRS_j \in D$ such that $$c(JCRS_j) < c(JCRS_j^*) \quad (4)$$

The individual candidate resolution strategies that make up a Pareto-optimal solution are denoted as $CRS_1^{j*}, \ldots, CRS_i^{j*}, \ldots, CRS_{n_j}^{j*}$. Considering the individual costs in $c(JCRS_j^*)$, given by $c(JCRS_j^*) = c(CRS_1^{j*}), \ldots, c_i(JCRS_j^*) = c(CRS_i^{j*}), \ldots, c_{n_j}(JCRS_j^*) = c(CRS_{n_j}^{j*})$, there is no $JCRS_j \in D_j$ that can cause a reduction in one of these costs without simultaneously causing an increase an at least one of the others. As said above, the Pareto set of the problem (2), denoted as $P_j$, contains all the conflict-free joint candidate resolution strategies for CDN that fulfil (4).

The conflict resolution process 120 proposes to resolve the conflicts in SLj by means of a $JCRS_j^*$ selected from the Pareto set, Pj. To that aim, the conflict resolution process 120 must first search for Pareto-optimal solutions from which to choose. In other words, the conflict resolution process 120 must build a suitable subset of the Pareto set. Once an appropriate number of conflict-free, Pareto-optimal joint candidate resolution strategies have been found, the conflict resolution process 120 selects the one considered equitable according to axiomatic bargaining principles. Axiomatic bargaining is a field of game theory that provides axioms on how to select solutions with certain properties, such as equity, to a game. In the present context, we can consider the selection of the equitable JCRSj as a game involving the aircraft in CDNj. It is clear that an equitable solution to the game should be Pareto-optimal, JCRS*$_j$, as a strategy that is not Pareto-optimal will not be unanimously preferred by all players (it will not be equitable to some players). However, Pareto-optimality alone is not sufficient, as some Pareto-optimal solutions may be considered more equitable than others. For example, some Pareto-optimal JCRS*$_j$ may result in very high costs for some aircraft and very low costs for some other aircraft, while other Pareto-optimal JCRS*$_j$ may distribute the costs (i.e. time variation) among the aircraft 16 more equitably. Axiomatic bargaining principles will be used to guide the selection of the most equitable JCRS*$_j$ among those found, with equity in this context reflecting equality in cost distribution.

The selected most-equitable Pareto-optimal strategy is the one proposed to resolve the conflicts in SLj.

The mathematical method adopted to generate Pareto-optimal solutions to (2) is the linear weighting method, which consists of converting the multi-objective optimization problem into a single-objective one where the function to be minimized is a linear combination of the costs $$C(CRS_1^j), \ldots, C(CRS_i^j), \ldots, C\left(CRS_{n_j}^j\right).$$

The resulting single-objective minimization problem is stated as follows: minimise $$w(JCRS_j) = w_1 c_1(JCRS_j) + \ldots + w_i c_i(JCRS_j) + \ldots + w_{n_j} c_{n_j}(JCRS_j) = w_1 c(CRS_1^j) + \ldots + w_i c(CRS_i^j) + \ldots + w_{n_j} c(CRS_{n_j}^j)$$

subject to $JCRS_j \in D_j$, $D_j \subset X_j$ \quad (5)

The factors wi, with $i \in \{1, \ldots, n_j\}$, are called weights and are assumed to be positive and normalized so that $$\sum_i w_i = 1.$$

Given a combination of values for the weights that comply with the above conditions, the solution of the resulting single-objective minimization problem (5) is a Pareto-optimal solution of the multi-objective minimization problem (2).

The problem of searching for an element of the Pareto set of (2) has been recast as a constrained linear programming problem, which consists of finding the global minimum of a single-objective constrained minimization problem where the objective function is a linear function of the costs associated to the individual candidate resolution strategies in a joint candidate resolution strategy.

The generation of candidate resolution strategies is at the core of the conflict resolution process 120. As mentioned above, the final aim of the conflict resolution process 120 is to find, for each conflicting aircraft 16, a candidate resolution strategy (i.e. an allowable instance of aircraft intent) whose corresponding predicted trajectory is feasible and conflict-free and results in an equitable share of the resolution costs for the operator. It has been seen that the search for an equitable, conflict-free joint candidate resolution strategy for a conflict dependent network is based on minimizing a function of the costs associated to the individual candidate resolution strategies in the joint candidate resolution strategy. Thus, the generation of candidate resolution strategies is at the core of the conflict resolution process 120.

The candidate resolution patterns (CRPs) mentioned above are parameterized instructions used as a template to generate different instructions of the same type. The amended instructions would result in a new trajectory that could resolve the conflicts in which the aircraft 16 is involved. Examples of instructions that will be used to build simple candidate resolution patterns are:

Speed reduction: a sequence of instructions that result in a reduced aircraft speed. A speed reduction may be used to create a delay required to avoid coming into conflict with a preceding aircraft.

Speed increase: a sequence of instructions that result in an increased aircraft speed. A speed increase may be used to gain time required to avoid coming into conflict with a following aircraft.

Altitude change: a sequence of instructions that result in an altitude change.

Figure 9A:
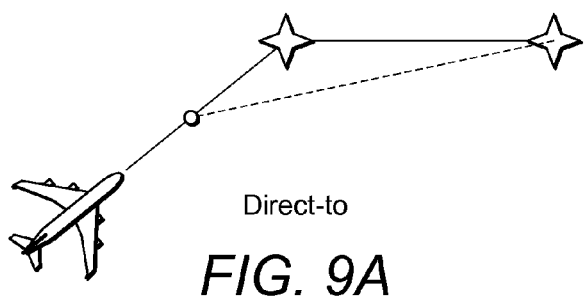
FIGS. 9a and 9b show two examples of how trajectories may be modified to resolve conflicts.

Direct-to: a sequence of lateral instructions that result in a new RNAV horizontal track where the aircraft 16 skips waypoints of the original procedure (it flies direct to a downstream waypoint). A direct-to may be used to create a delay or to avoid an area of conflict (see FIG. 9*a*).

Figure 9B:
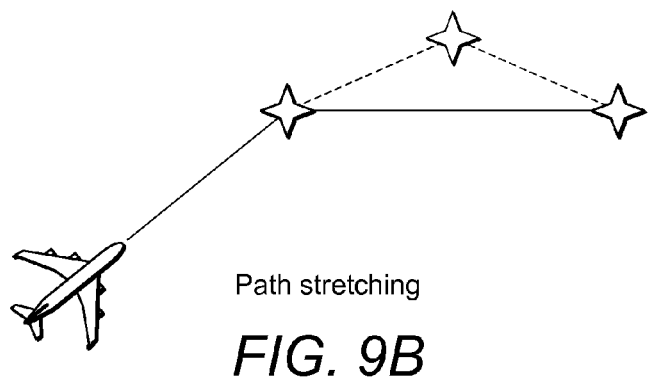

Path stretching: a sequence of lateral instructions that result in a new RNAV horizontal track where waypoints are added to the original procedure. Path stretching may be used to gain time or to avoid an area of conflict (see FIG. 9*b*).

When revising aircraft intent data 28 to remove a conflict, the nature of the conflict for the aircraft 16 currently being considered is determined. For example, whether the conflict arises because the current aircraft 16 is catching up with the preceding aircraft 16 may be determined. If so, CRPs that create a delay may be selected. Alternatively, if the conflict arises because the current aircraft 16 is falling behind and coming into conflict with a following aircraft 16, CRPs that give rise to gains in time may be selected. As a further alternative, conflicts arising from paths that cross rather than converge may see CRPs including an altitude change selected.

Once a CRP is selected, random changes to parameters of the aircraft intent 28 may be made, optionally within limits, to generate the candidate resolution strategies. For example, random altitude changes may be used, or random speed changes may be used. The candidate resolution strategies generated in this way for each aircraft 16 may be grouped into joint candidate resolution strategies and the best joint candidate resolution strategies may be selected, as described above.

Figure 10:
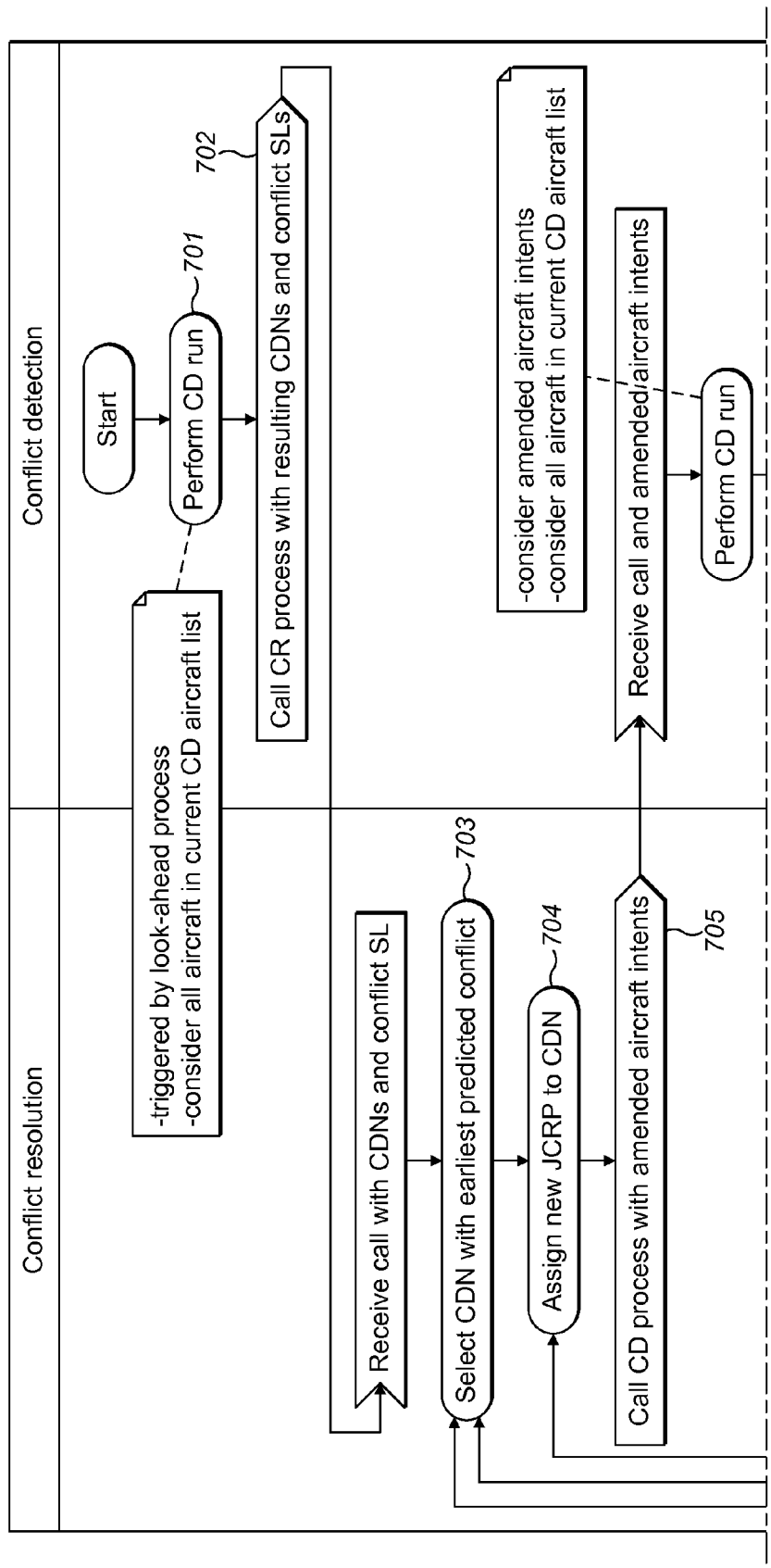
FIG. 10 is a flow chart representation of a conflict resolution process.
Figure 10:
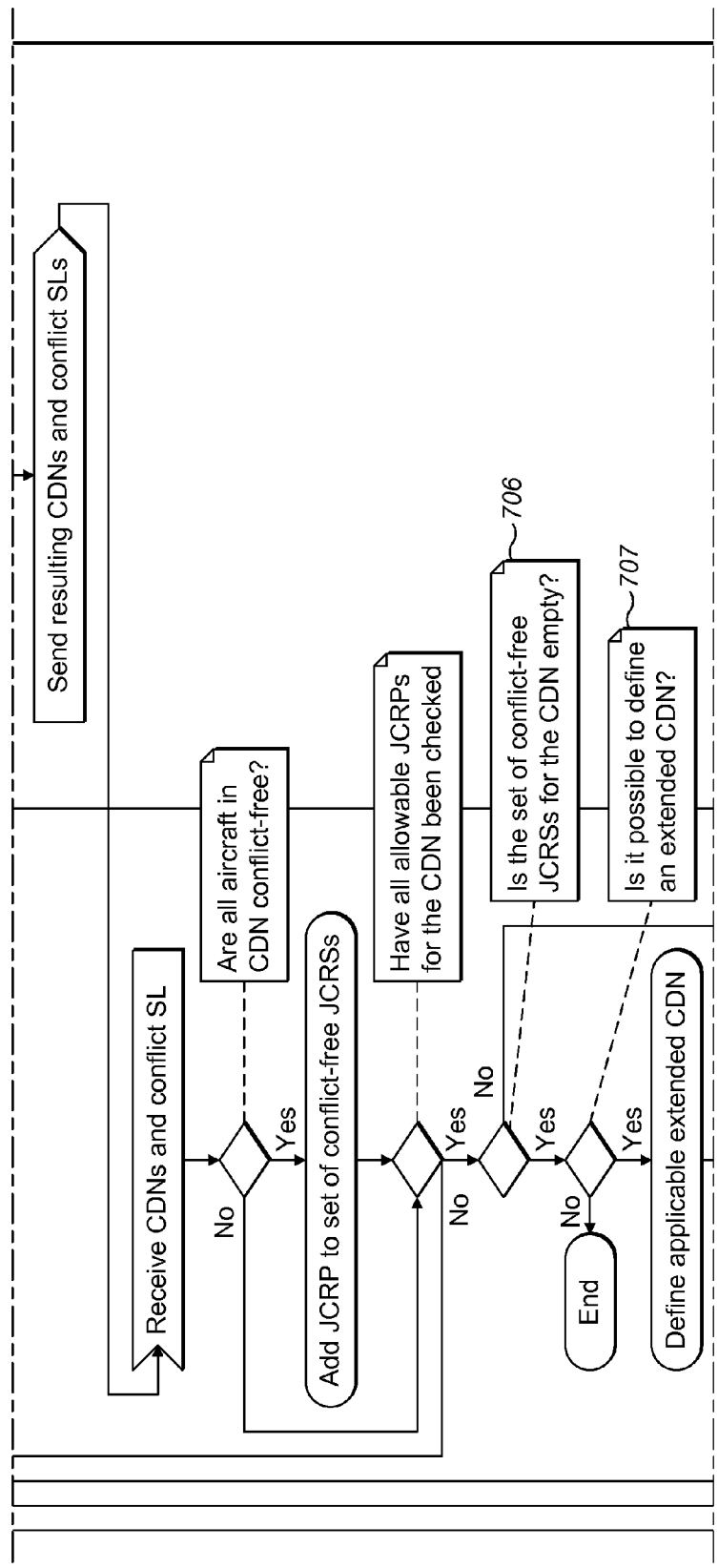
Figure 10:
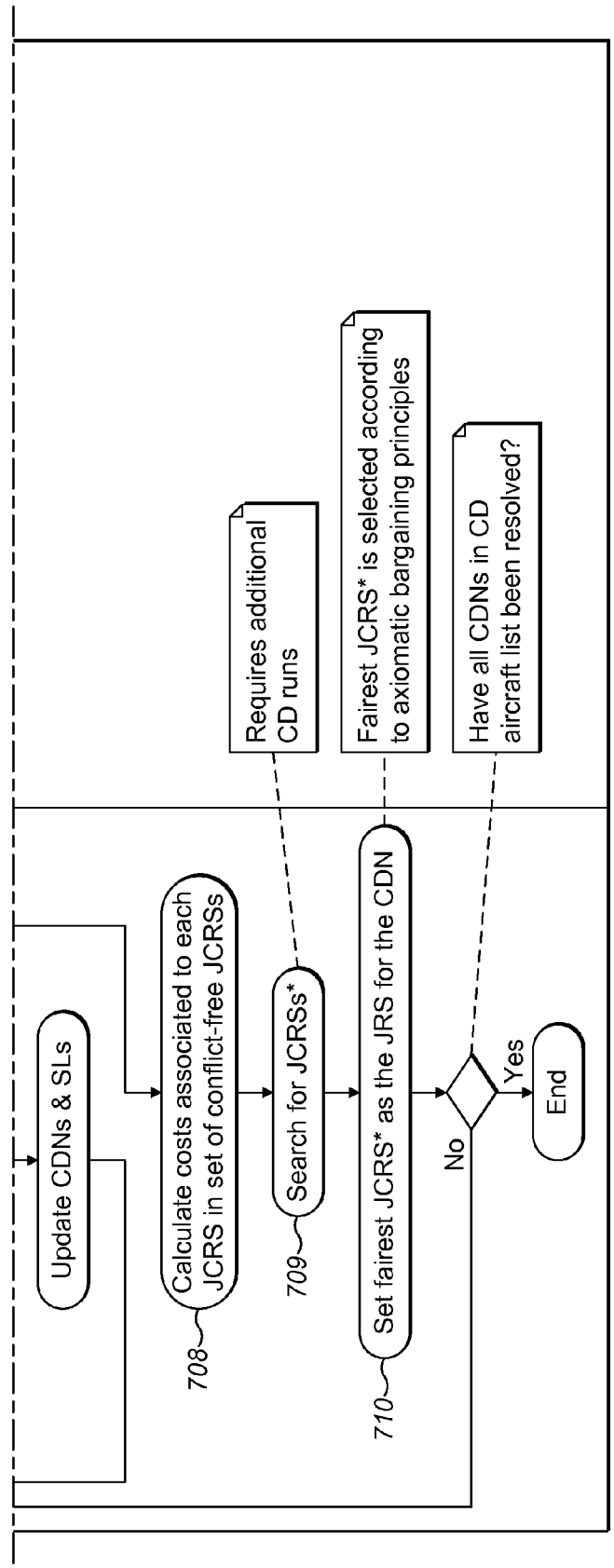

Considering the different concepts introduced above, there follows a brief step-by-step description of a full run of the conflict resolution process 120, which is schematically explained by FIG. 10.

1. When a run of the conflict detection process 110 is completed at 701, the conflict detection process 110 calls the conflict resolution process 120 at 702. The conflict detection process 110 provides the conflict resolution process 120 with the required conflict-related information, namely conflict dependent networks and conflict sub-lists.

2. The conflict resolution process 120 proceeds one conflict dependent network at a time starting at 703, simultaneously considering all the conflicts in a sub-list.

3. For any network CDNj, the resolution of the conflicts in SLj is based on a set of joint candidate resolution Patterns (JCRPs) for CDNj. A JCRPj is a JCRSj made up of candidate resolution patterns, $JCRP_j = \{CRP_1^j, \ldots, CRP_i^j, \ldots, CRP_{n_j}^j\}$. To generate a JCRPj at 704, a candidate resolution pattern must be assigned to each of the aircraft in CDNj. In principle, any allowable candidate resolution pattern for $A_i^j$ could be selected as $CRP_i^j$. The only restriction on the candidate resolution patterns in JCRPj comes from the fact that, when a conflict involves two aircraft with no earlier conflicts in SLj, at least one of the two aircraft must act upon the conflict. Consequently, the candidate resolution pattern assigned to at least one of the two aircraft must include an alternative sequence of instructions that changes the aircraft intent and trajectory prior to the initiation of the conflict interval (the sequence must be triggered before the conflict starts). A series of heuristics will be in place to guide the selection of allowable candidate resolution patterns for $A_i^j$ and the definition of the parameters and trigger conditions of the alternative sequences included in the selected candidate resolution patterns, as described above. These heuristics will be based on the preferred intent of $A_i^j$ and the attributes of the conflicts in which it is involved. For example, the position of the conflict interval along the prediction timeline will help determine the triggers of the alternative instructions and the intensity and duration of the conflicts will help define the values of their parameters.

4. At 705, the conflict detection process 110 is called by the conflict resolution process 120 to check whether the generated JCRPjs are conflict-free. If no conflict-free JCRPjs can be found at 706, heuristic methods are employed at 707 to extend CDNj by including the aircraft 16 interfering with the JCRPjs. Thus, it is implicitly assumed that the reason why the allowable joint conflict resolution patterns do not result in a conflict-free conflict dependent network is because they create conflicts with aircraft 16 outside the network. If an interfering aircraft 16 is itself including in a conflict dependent network, then that conflict dependent network must be considered in combination with CDNj for conflict resolution.

5. The resulting conflict-free JCRPjs are considered as the initial JCRSjs to initiate the search for Pareto-optimal conflict-free $JCRS^*_j$ at 708.

6. A subset of the Pareto set, i.e. set of conflict-free $JCRS^*_j$s is built at 709. To generate this subset, the minimization problem in (6) must be repeatedly solved for different sets of values for the weights, so as to obtain Pareto-optimal solutions that cover all areas of the Pareto set. To resolve the minimization problem, a stochastic optimization algorithm is employed. This algorithms will search for the minimum of w(JCRSj) from among JCRSjs generated from the initial joint conflict resolution patterns by randomizing the parameters and trigger conditions of the alternative instructions introduced in the $CRP_i^j$s.

7. Once a set of conflict-free Pareto-optimal solutions $JCRS^*_j$s is available, the most equitable solution among the ones obtained is selected at 710 as the joint resolution strategy for CDNj, denoted as JRSj.

Steps 3 to 7 are performed for each of the identified conflict dependent networks. The Joint Resolution Strategy for all the conflicting aircraft is the combination of the JRSjs obtained for the different CDNjs Variations It will be clear to the skilled person that modifications may be made to the embodiments described above without departing from the scope of the disclosure.

For example, the present disclosure enjoys particular benefit when applied to air traffic management dealing with the most challenging scenario of predominantly converging paths such as terminal arrivals. Nonetheless, the present disclosure will of course also bring benefits to less challenging environments like diverging paths as for terminal departures and also crossing paths.

It will be appreciated that the location of parts of the present disclosure may be varied. For example, trajectories may be calculated by ground-based or air-based systems. For example, the air traffic management may be ground-based, but need not necessarily be so. The air traffic management need not be centralized. For example, a distributed air-based system could be possible.

Different air traffic management may cooperate and share information. For example, air traffic management having responsibility for adjacent airspaces may pass trajectory information for aircraft anticipated to cross between the adjacent airspaces.

The invention claimed is:

1. A computer-implemented method of managing airspace through which a plurality of aircraft are flying, comprising:
   receiving, from the aircraft, user preferred aircraft intent data that unambiguously defines the user preferred trajectory of each aircraft;
   calling an initial conflict detection procedure comprising:
      calculating the corresponding user preferred trajectories from the user preferred aircraft intent data; and
      comparing the user preferred trajectories so as to identify one or more conflicts between trajectories and to identify conflicted aircraft predicted to fly the identified conflicting trajectories;
   calling an initial conflict resolution procedure comprising:
      selecting one or more identified conflicts, characterising the selected conflict and responsively revising the user preferred aircraft intent data of one of the aircraft involved in the selected conflict in a way that should remove the conflict;
   after calling the initial conflict resolution procedure, calling a further conflict detection procedure comprising:
   calculating revised trajectories from the corresponding revised aircraft intent data;
   comparing the user-preferred trajectories for aircraft not subject to revised aircraft intent data and revised trajectories for the aircraft subject to revised aircraft intent data so as to identify one or more conflicts between trajectories and to identify still-conflicted aircraft predicted to fly the identified conflicting trajectories; and
   if conflicts are identified during the further conflict detection procedure, calling a further conflict resolution procedure,
      wherein the further conflict resolution procedure comprises selecting one or more identified conflicts, characterising the selected conflict and responsively revising the user preferred aircraft intent data or revised aircraft intent data of one of the aircraft involved in the selected conflict in a way that should remove the conflict, and calling the further conflict detection procedure;
   or
   if no conflicts are identified during the further conflict detection procedure, continuing to the step of sending the revised aircraft intent;
   sending the revised aircraft intent data to the corresponding conflicted aircraft; and
   managing the airspace by ordering at least one of the aircraft to alter course.

2. The method of claim 1, wherein the step of responsively revising the user preferred aircraft intent data or revised aircraft intent data in the initial or further conflict resolution procedure is performed by selecting a revision from a set of candidate resolution patterns.

3. The method of claim 2, wherein the step of responsively revising the user preferred aircraft intent data or revised aircraft intent data in the initial or further conflict resolution procedure further comprises:

storing each instance of revised aircraft intent data so as to form a first joint candidate resolution pattern when all conflicts have been removed;

repeating the steps of calling the initial conflict detection and resolution procedures and, if conflicts are found, calling the further conflict detection procedure so as to form at least a second joint candidate resolution pattern;

selecting one of the joint candidate resolution strategies; and sending the revised aircraft intent data from the selected joint candidate resolution strategy to the corresponding conflicted aircraft.

4. The method of claim 3, comprising selecting one of the joint candidate resolution strategies according to an evaluation of the total change in path length or time of arrival of the revised trajectories for each joint candidate resolution strategy.

5. The method of claim 3, comprising selecting one of the joint candidate resolution strategies according to an evaluation of how each joint candidate resolution strategy distributes changes in trajectories between the aircraft or changes in time of arrival between the aircraft.

6. The method of claim 2, wherein the step of characterising the selected conflict in the initial or further conflict resolution procedure comprises determining the cause of the reduced separation between the conflicted aircraft, and revising the aircraft intent data comprises revising aircraft intent data to reverse the cause.

7. The method of claim 6, wherein the candidate resolution patterns include patterns that cause the aircraft intent data to be revised to cause at least one of: an increase in altitude of one of the conflicted aircraft, a decrease in altitude of one of the conflicted aircraft, an increase in speed of one of the conflicted aircraft, a decrease in speed of one of the conflicted aircraft, an increase in path length of one of the conflicted aircraft optionally by adding one or more waypoints to the path, and a decrease in path length of one of the conflicted aircraft optionally by removing one or more waypoints from the path.

8. The method of claim 7, wherein the step of responsively revising the user preferred aircraft intent data or revised aircraft intent data in the initial or further conflict resolution procedure is performed in a partially random manner.

9. The method of claim 8, wherein selecting a revision from a set of candidate resolution patterns comprises determining which of the patterns are suitable for removing the selected conflict, and selecting randomly one of the suitable patterns.

10. The method of claim 8, wherein selecting a revision from a set of candidate resolution patterns comprises determining which of the patterns are suitable for removing the selected conflict, selecting one of the suitable patterns and revising a parameter associated with the selected pattern by a random amount.

11. A system for managing airspace through which a plurality of aircraft are flying, the system comprising:

a computer apparatus;

a non-transitory computer readable medium comprising instructions stored thereon, that when executed by the computer apparatus, causes the computer apparatus to:

receive from the aircraft, user preferred aircraft intent data that unambiguously defines the user preferred trajectory of each aircraft;

call an initial conflict detection procedure comprising:
calculating the corresponding user preferred trajectories from the user preferred aircraft intent data; and
comparing the user preferred trajectories so as to identify one or more conflicts between trajectories and to identify conflicted aircraft predicted to fly the identified conflicting trajectories;

call an initial conflict resolution procedure comprising:
selecting one or more identified conflicts, characterising the selected conflict and responsively revising the user preferred aircraft intent data of one of the aircraft involved in the selected conflict in a way that should remove the conflict;

after the initial conflict resolution procedure, call a further conflict detection procedure comprising:
calculating revised trajectories from the corresponding revised aircraft intent data;
comparing the user-preferred trajectories for aircraft not subject to revised aircraft intent data and revised trajectories for the aircraft subject to revised aircraft intent data so as to identify one or more conflicts between trajectories and to identify still-conflicted aircraft predicted to fly the identified conflicting trajectories;

if conflicts are identified during the further conflict detection procedure, calling a further conflict resolution procedure, wherein the further conflict resolution procedure comprises selecting one or more identified conflicts, characterising the selected conflict and responsively revising the user preferred aircraft intent data or revised aircraft intent data of one of the aircraft involved in the selected conflict in a way that should remove the conflict, and calling the further conflict detection procedure; or if no conflicts are identified during the further conflict detection procedure, continuing to the step of sending the revised aircraft intent; and send the revised aircraft intent data to the corresponding conflicted aircraft.

12. The system of claim 11, wherein responsively revising the user preferred aircraft intent data or revised aircraft intent data in the initial or further conflict resolution procedure, is performed by selecting a revision from a set of candidate resolution patterns.

13. The system of claim 12 wherein said non-transitory computer readable medium comprises further instructions, that when executed by the computer apparatus, causes the computer apparatus to perform the step of responsively revising the user preferred aircraft intent data or revised aircraft intent data in the initial or further conflict resolution procedure, wherein the step of responsively revising comprises:

storing each instance of revised aircraft intent data so as to form a first joint candidate resolution pattern when all conflicts have been removed;

repeating the steps of calling the initial conflict detection and resolution procedures and, if conflicts are found, calling the further conflict detection procedure so as to form at least a second joint candidate resolution pattern;

selecting one of the joint candidate resolution strategies; and sending the revised aircraft intent data from the selected joint candidate resolution strategy to the corresponding conflicted aircraft.

14. The system of claim 13 wherein selecting one of the joint candidate resolution strategies comprises selecting according to an evaluation of the total change in path length or time of arrival of the revised trajectories for each joint candidate resolution strategy.

15. The system of claim 13 wherein selecting one of the joint candidate resolution strategies comprises selecting according to an evaluation of how each joint candidate resolution strategy distributes changes in trajectories between the aircraft or changes in time of arrival between the aircraft.

16. The system of claim 12 wherein the step of characterising the selected conflict in the initial or further conflict resolution procedure comprises determining the cause of the reduced separation between the conflicted aircraft, and revising the aircraft intent data comprises revising aircraft intent data to reverse the cause.

17. The system of claim 16 wherein the candidate resolution patterns include patterns that cause the aircraft intent data to be revised to cause at least one of: an increase in altitude of one of the conflicted aircraft, a decrease in altitude of one of the conflicted aircraft, an increase in speed of one of the conflicted aircraft, a decrease in speed of one of the conflicted aircraft, an increase in path length of one of the conflicted aircraft optionally by adding one or more waypoints to the path, and a decrease in path length of one of the conflicted aircraft optionally by removing one or more waypoints from the path.

* * * * *